(12) United States Patent
Kawakami et al.

(10) Patent No.: US 8,140,011 B2
(45) Date of Patent: Mar. 20, 2012

(54) RADIO NODE APPARATUS, MULTI-HOP RADIO SYSTEM, AND MULTI-HOP RADIO SYSTEM CONSTRUCTING METHOD

(75) Inventors: Tetsuya Kawakami, Kanagawa (JP); Yoshihiro Suzuki, Tokyo (JP); Masayuki Fujise, Tokyo (JP)

(73) Assignees: Panasonic Corporation, Osaka (JP); National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 12/947,592

(22) Filed: Nov. 16, 2010

(65) Prior Publication Data

US 2011/0065380 A1    Mar. 17, 2011

Related U.S. Application Data

(62) Division of application No. 11/196,530, filed on Aug. 4, 2005, now Pat. No. 7,885,601.

(30) Foreign Application Priority Data

Aug. 6, 2004    (JP) .................................. 2004-231597
Aug. 6, 2004    (JP) .................................. 2004-231608

(51) Int. Cl.
*H04B 5/00*    (2006.01)
*H04B 7/15*    (2006.01)

(52) U.S. Cl. ...................... 455/41.1; 455/41.2; 455/41.3; 455/7; 455/11.1; 455/15; 455/16; 455/518; 455/519

(58) Field of Classification Search .................. 455/41.1, 455/41.2, 41.3, 7, 11.1, 15, 16, 518, 519
See application file for complete search history.

(56) References Cited

U.S. PATENT DOCUMENTS

| | | | |
|---|---|---|---|
| 6,879,806 | B2 | 4/2005 | Shorty |
| 7,092,713 | B2 | 8/2006 | Raji |
| 7,212,833 | B2 | 5/2007 | Sugaya |
| 7,356,347 | B1 | 4/2008 | Kammer |
| 2002/0028656 | A1 | 3/2002 | Yemini |
| 2002/0044549 | A1 | 4/2002 | Johansson |
| 2003/0099221 | A1 | 5/2003 | Rhee |
| 2004/0023617 | A1 | 2/2004 | Mahany |
| 2004/0023651 | A1 | 2/2004 | Gollnick |
| 2005/0282494 | A1 | 12/2005 | Kossi |

FOREIGN PATENT DOCUMENTS

| | | |
|---|---|---|
| JP | 2001-237764 | 8/2001 |
| JP | 2004-222008 | 8/2004 |

OTHER PUBLICATIONS

European Search Report dated Nov. 24, 2005. Japanese Office Action dated Oct. 16, 2009.

*Primary Examiner* — Wen Huang
(74) *Attorney, Agent, or Firm* — Dickinson Wright PLLC

(57) ABSTRACT

The present invention provides a radio node apparatus, a multi-hop radio system and a multi-hop radio system constructing method, capable of constructing a tree type multi-hop radio system in which mutual radio nodes determine a radio node which becomes a root node of a tree in an autonomous manner and the root node is set as a root in an autonomous manner. The radio node apparatus includes a storage unit for storing state information, used for constructing a multi-hop radio system, including information for specifying a root radio node apparatus positioned at a summit of the multi-hop radio system, with the radio node apparatus has a connection, and the number of hops from the root ratio node apparatus, a collection unit for collecting state information transmitted from surrounding radio node apparatus, and a selection unit for selecting a host connection-accepting radio node apparatus on the basis of the information for specifying the root radio node apparatus and the number of hops included in the collected state information.

6 Claims, 14 Drawing Sheets

| NUMBER OF NODES(N) | NUMBER OF HOPS(H) | ROOT NODE ID (R-ID) | NODE ID (N-ID) |
|---|---|---|---|

FIG. 12

| CHILD NODE ID | NUMBER OF NODES |
|---|---|
| NODE 3 | 1 |
| NODE 4 | 2 |

FIG. 13

| ROOT NODE ID (R—ID) | IT OWN NODE ID (N—ID) | OBJECT NODE ID (T—ID) | CHANGE NODE NUMBER (ΔN) |
|---|---|---|---|

FIG. 17A        PRIOR ART
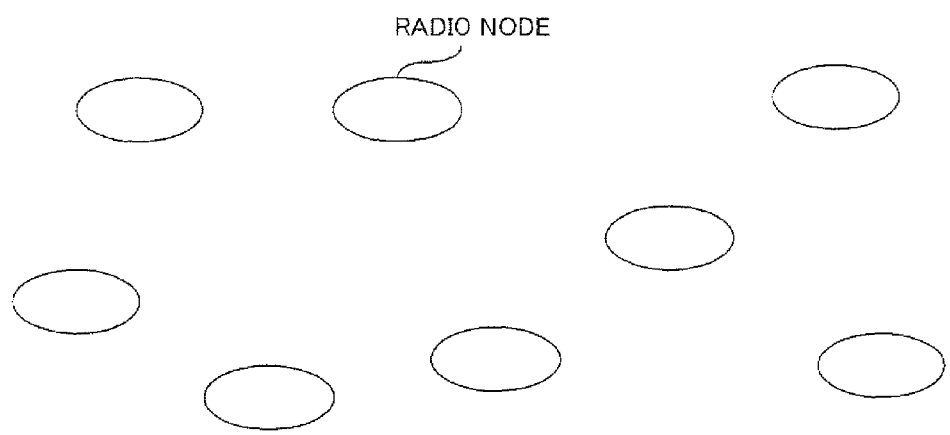
FIG. 17B        PRIOR ART
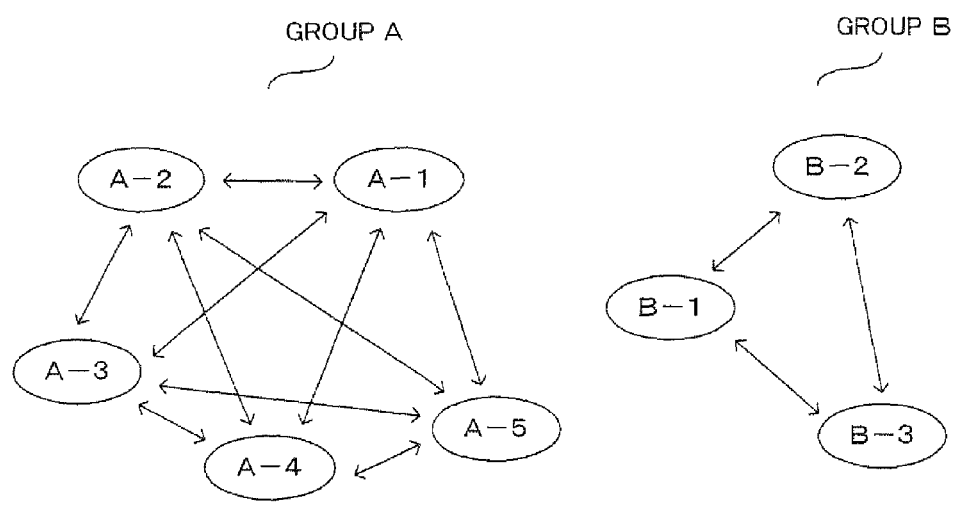

RADIO NODE APPARATUS, MULTI-HOP RADIO SYSTEM, AND MULTI-HOP RADIO SYSTEM CONSTRUCTING METHOD

This is a divisional application of application Ser. No. 11/196,530 filed Aug. 4, 2005, which is based on Japanese Application No. 2004-231597 filed Aug. 6, 2004, and Japanese Application No. 2004-231608 filed Aug. 6, 2004, the entire contents of each of which are incorporated by reference herein.

FIELD OF THE INVENTION

The present invention relates to a radio node apparatus made to construct a multi-hop radio system in an autonomous fashion, multi-hop radio system and multi-hop radio system constructing method.

DESCRIPTION OF THE RELATED ART

At present, the standard "IEEE802.11" for radio systems prescribes two modes as radio system modes: an ad hoc mode in which a group is made among radio nodes (each of which will be referred to hereinafter as a "radio node apparatus"), at which radio waves directly arrive, without interposing one specified base station (hereinafter referred to as an "AP (Access Point)") so as to carry out direct communications and an infrastructure mode in which an AP is put to use and radio nodes (hereinafter referred to as an "STA (Station)") existing in a range radio waves from the AP reach are connected into a star form with respect to the AP to be mutually communicable through the AP. The employment of such radio system technologies enables a radio node to attend and leave the communications in an ad hoc manner and further to make communications while moving. However, in the ad hoc mode, these communications require that the radio wave directly reaches a communication partner and, in the infrastructure mode, they require that the radio wave directly reaches the AP, while difficulty is experienced in making communications through only a radio link with respect to a partner at which the radio wave does not arrive.

Moreover, the patent document 1 (Japanese Patent Laid-Open No. 2001-237764 (FIG. 1)) discloses the potential of a radio system as one example of speeding-up of mobile communications, that is, it provides a method of constructing a multi-hop radio network among radio nodes as one means to enlarge a service offering area in a system where a communication area of a base station (AP) is smaller in comparison with that of mobile communications such as a PDC (Personal Digital Cellular). In the invention disclosed in the aforesaid patent document 1, each of radio nodes only establishes a channel up to a base station for the purpose of only making communications from each radio node to the base station on a star type network, wherein the base station is set as the highest-rank station between the base station and the radio nodes and each radio node uniquely determines a host connection-accepting (connected-to) radio node. In addition, the highest-rank station (base station) does not fully control the construction of a star-type multi-hop radio network but each radio node realizes a multi-hop radio network in an autonomous (or self-sustaining) fashion by selecting a host radio node, which minimizes the number of hops up to the base station, as an optimum connection-accepting radio node on the basis of the number of hops counted from the base station.

However, a radio system according to the standard "IEEE802.11" does not have an arrangement to carry out the multi-hop among a plurality of radio nodes and, although a plurality of radio nodes shown in FIG. 17A form groups shown in FIG. 17B in an autonomous fashion, difficulty is encountered in, even if a radio node A-5 and a radio node B-1 lie at a communicable position between two groups A and B, establishing communications between a radio node A-2 and a radio node B-3 through the use of this situation. In addition, although the invention disclosed in the patent document 1 can construct a multi-hop network in an autonomous manner, it requires an apparatus serving as a base station. Although a given radio node can also be utilized as a base station, there is a need to set one radio node as a base station. Accordingly, a variation takes place from a state before a construction of a tree as shown in FIG. 18A to a state of a construction of a tree based on the number of hops from a base station 1800 as shown in FIG. 18B. However, a radio node, which is not connectable to any radio node connected to the tree from the base station 1800, cannot make communications. For this reason, there is a problem in that, although the radio nodes a, b and c shown in FIGS. 18A and 18B lie at positions communicable to each other, a channel therebetween is not set so that they cannot make communications except that a connection to the tree from the base station 1800 takes place because of the enlargement of the tree from the base station 1800, and the movement thereof or the like.

SUMMARY OF THE INVENTION

The present invention has been developed with a view to eliminating the above-mentioned problems, and it is therefore an object of the invention to provide a radio node apparatus capable of constructing a tree type multi-hop radio system in which mutual radio nodes determine a radio node which becomes a root node of a tree in an autonomous manner and the root node is set as a root in an autonomous manner, a multi-hop radio system and a multi-hop radio system constructing method.

To achieve this and other objects of the invention, a method is disclosed for constructing a multi-hop radio system, which includes a plurality of radio nodes ad-hoc connected in a tree structure, for carrying out multi-hop communication via at least one radio node among the plurality of radio nodes. A first radio node among the plurality of radio nodes acquires, from a plurality of second radio nodes, state information including the number of radio nodes included in a group to which the second radio nodes are ad-hoc connected, the number of hops from a root node of the group to the second radio nodes, and identification information on the second radio nodes. The first radio node compares a first node count which is the number of radio nodes to which the first radio node is ad-hoc connected with a second node count which is the number of radio nodes included in the acquired state information to select and connect to a second radio node whose second node count is larger than the first node count and having the smallest number of hops among the plurality of second radio nodes. In the case where the first radio node reselects a radio node to be a connection-accepting radio node after the connection between the first radio node and the selected second radio node is disconnected, the first radio node selects and connects to a radio node which is the second radio node selected before the disconnection and whose second node count is smaller than the first node count.

In a preferred embodiment, the first radio node acquires the state information from the plurality of second radio nodes only in the case where the first radio node is a root node of the radio nodes to which the first radio node is ad-hoc connected.

To further achieve this and other objects of the invention, a radio node apparatus is disclosed in a multi-hop radio system, which includes a plurality of radio nodes ad-hoc connected in a tree structure, for carrying out multi-hop communication via at least one radio node among the plurality of radio nodes. The radio node apparatus includes a transmission unit that transmits a request of acquiring state information including the number of radio nodes included in a group to which other radio nodes are ad-hoc connected, the number of hops from a root node of the group to the other radio nodes, and identification information on the other radio nodes, from the other radio nodes other than a subject node as the radio node apparatus among the plurality of radio nodes. A reception unit receives the state information from the plurality of other radio nodes. A control unit compares a first node count which is the number of radio nodes to which the subject node is ad-hoc connected with a second node count which is the number of radio nodes included in the received state information to select and connect to a radio node whose second node count is larger than the first node count and having the smallest number of hops among the plurality of other radio nodes. In the case of reselecting a radio node to be a connection-accepting radio node after the connection between the subject node and the selected radio node other than the subject node is disconnected, selecting and connecting to a radio node which is the radio node, other than the subject node, selected before the disconnection and whose second node count is smaller than the first node count.

In a preferred embodiment of the radio node apparatus, the transmission unit transmits the request of acquiring the state information only in the case where the subject node is a root node of the radio nodes to which the subject node is ad-hoc connected.

In accordance with an aspect of the present invention, there is provided a radio node apparatus for use in a tree-structured multi-hop radio system including a plurality of radio nodes, at least a portion of which is used as a repeater for carrying out multi-hop communication at layer 2, said radio node apparatus comprising, a storage unit that stores state information, used for constructing said multi-hop radio system, including information that specifies a root radio node positioned at a summit of said multi-hop radio system, with which the radio node apparatus has a connection, and the number of hops from the radio node apparatus to said root radio node; a collection unit that collects state information, of said plurality of radio nodes, transmitted from surrounding radio nodes around said radio node apparatus; and a selection unit that selects a host connection-accepting radio node on the basis of the information that specifies said root radio node and the number of hops included in the state information collected from said surrounding radio nodes. This arrangement can construct a tree type multi-hop radio system in which a root node is set as a root in an autonomous manner.

In the radio node apparatus according to the present invention, a selection unit (i) selects radio nodes as candidates for a host connection-accepting radio node, on the basis of the information, in the state information collected from surrounding radio nodes, that specifies a root radio node, (ii) determines, among the radio nodes selected as said candidates, a radio node with the smallest number of hops as a particular candidate for said host connection-accepting radio node, and (iii) makes a comparison between the root radio node specifying information and the number of hops in the state information of the particular candidate, and the root radio node specifying information and the number of hops held in said storage unit of said radio node apparatus, so as to, when a result of the comparison exceeds a predetermined comparison reference, select the particular candidate as said host connection-accepting radio node This enables a group arrangement to be established on the basis of the root radio node apparatus specifying information (ID) in an autonomous fashion.

In addition, the radio node apparatus according to the present invention further may comprise a change unit that rewrites, when said selection unit selects said host connection-accepting radio node, the root radio node specifying information as the root radio node specifying information held in said host connection-accepting radio node and rewrites a value of the number of hops from said root radio node as a value obtained by adding 1 to the number of hops in said host connection-accepting radio node. This can reliably change the state information which varies according to connection.

Still additionally, in the radio node apparatus according to the present invention, the state information may include a group priority indicative of a connection priority of a group, with which said radio node apparatus has a connection, and said selection unit checks said group priority with a first priority to select a radio node apparatus with a higher group priority as said host connection-accepting radio node. This can more efficiently construct a tree type multi-hop radio system in which a root node is set as a root in self-sustaining manner.

Yet additionally, the radio node apparatus according to the present invention further may comprise a change unit that, when said selection unit selects said host connection-accepting radio node, rewrites, of the group priority, the root radio node specifying information and the number of hops, the group priority and the root radio node specifying information as the group priority and the root radio node specifying information held in said host connection-accepting radio node, and rewrites a value of the number of hops from said root radio node as a value obtained by adding 1 to the number of hops in said host connection-accepting radio node. This can reliably change the state information which varies according to connection.

Moreover, in accordance with another aspect of the present invention, there is provided a tree-structured multi-hop radio system including a plurality of radio nodes, at least a portion of which is used as a repeater for carrying out multi-hop communication at layer 2, wherein each of said radio nodes stores, in a predetermined storage region, state information, used for constructing said multi-hop radio system, including information for specifying a root radio node positioned at a summit of said multi-hop radio system, with which it has a connection, and the number of hops from said root ratio node, and collects state information transmitted from surrounding radio nodes around it, and selects a host connection-accepting radio node on the basis of the information for specifying said root radio node and the number of hops included in the collected state information. This arrangement can construct a tree type multi-hop radio system in which a root node is set as a root in an autonomous manner.

Still moreover, in the multi-hop radio system according to the present invention, the radio node apparatus selects radio nodes as candidates for said host connection-accepting radio node on the basis of the information for specifying the root radio node and sets, of the selected candidate radio nodes, a radio node with the smallest number of hops as a particular candidate for the host connection-accepting radio node and makes a comparison between the root radio node specifying information and the number of hops in the state information of the particular candidate, and the root radio node specifying information and the number of hops held in said storage region of said radio node apparatus so as to, when a result of the comparison exceeds a predetermined comparison reference, select the particular candidate as said host connection-accepting radio node. This enables a group arrangement to be established on the basis of the root radio node apparatus specifying information (ID) in an autonomous fashion.

Yet moreover, in the multi-hop radio system according to the present invention, when the radio node apparatus selects said host connection-accepting radio node, said radio node apparatus can rewrite, of the root radio node specifying information and the number of hops stored in said storage region, the root radio node specifying information as the root radio node specifying information held in said host connection-accepting radio node and can rewrite a value of the number of hops from said root radio node as a value obtained by adding 1 to the number of hops in said host connection-accepting radio node. This can reliably change the state information which varies according to connection.

In addition, in the multi-hop radio system according to the present invention, the state information can include a group priority indicative of a connection priority of a group, with which said radio node apparatus has a connection, and said radio node apparatus checks said group priority with a first priority to select a radio node with a higher group priority as said host connection-accepting radio node. This can more efficiently construct a tree type multi-hop radio system in which a root node is set as a root in self-sustaining manner.

Still additionally, in the multi-hop radio system according to the present invention, when the radio node apparatus selects said host connection-accepting radio node, said radio node apparatus can rewrite, of the group priority, the root radio node specifying information and the number of hops stored in said storage region, the group priority and the root radio node specifying information as the group priority and the root radio node specifying information in said host connection-accepting radio node, and can rewrite a value of the number of hops from said root radio node as a value obtained by adding 1 to the number of hops held in said host connection-accepting radio node. This can reliably change the state information which varies according to connection.

Furthermore, in accordance with a further aspect of the present invention, there is provided a method of constructing a tree-structured multi-hop radio system including a plurality of radio nodes, at least a portion of which is used as a repeater for carrying out multi-hop communication at layer 2, comprising: a step in which, for selecting a host connection-accepting radio node, an arbitrary radio node of said plurality of radio nodes broadcasts a state information acquiring request to said plurality of radio nodes, other than said arbitrary radio node, each of which has state information including the total number of radio nodes connected to a tree-structured group with which each of the plurality of radio nodes has a connection, the number of hops from a root node positioned at a summit of said tree-structured group, identification information on said root node and its own identification information; a step in which said arbitrary radio node of said plurality of radio nodes receives said state information from said plurality of radio nodes other than said arbitrary radio node; and a step in which said arbitrary radio node of said plurality of radio nodes makes a comparison between the total number of radio nodes included in the received state information and the total number of radio nodes included in its own state information to select a radio node having said state information including the total number of radio nodes larger than the total number of radio nodes included in its own state information for selecting and connecting, of the selected radio node, a radio node having the smallest number of hops included in said state information as said host connection-accepting radio node. This arrangement can construct a tree-structured multi-hop radio system in which a root node is set as a root in an autonomous manner, and can make a connection with a group having more radio node apparatus to arrange a group having more communicable radio nodes with high efficiency.

Still furthermore, in the multi-hop radio system constructing method according to the present invention, the state information acquiring request can be broadcasted only when said arbitrary radio node of said plurality of radio nodes is a root node of a group. This can minimize the variation of the tree structure at connection and disconnection.

Yet furthermore, the multi-hop radio system constructing method according to the present invention further can comprise a step in which said radio node connected as said host connection-accepting radio node receives said state information transmitted from said radio node connected thereto and holds the total number of radio nodes, included in the received state information, for each of said radio nodes connected thereto. This can facilitate a decision on the number of radio nodes changed at connection and disconnection, which makes easy the management of the number of radio nodes in the entire group.

Moreover, the multi-hop radio system constructing method according to the present invention further can comprise a step in which said radio node connected as said host connection-accepting radio node outputs, to a radio node in a group with which it has a connection, an after-connection state change notification including at least identification information on said arbitrary radio node of said plurality of radio nodes connected thereto and the total number of radio nodes included in said state information transmitted from the radio node connected thereto. With this arrangement, it is possible to correctly seize the number of radio nodes in the entire system even in the case of changes of a plurality of connections (information). In addition, because of the employment of the identification information on the radio node which is an object of change, the double management is preventable by distinguishing between changes of a plurality of connections (information).

Still moreover, the multi-hop radio system constructing method according to the present invention further can comprise a step in which said arbitrary radio node of said plurality of radio nodes which selects said host connection-accepting radio node and makes connection therewith receives said state information transmitted from said host connection-accepting radio node and, on the basis of the received state information, outputs, to a radio node connected as a subordinate thereto, an after-connection connection change notification including identification information on a root node after connection, its own identification information, the total number of radio nodes included in the received state information and a value obtained by adding 1 to the number of hops included in the received state information. With this arrangement, when a root node is connected to a large group, it is possible to correctly notify the change of connection (information) to a radio node subject thereto.

Still moreover, the multi-hop radio system constructing method according to the present invention further can comprise a step in which, when said arbitrary radio node of said plurality of radio nodes which selects said host connection-accepting radio node and makes connection therewith is disconnected from said host connection-accepting radio node, said host connection-accepting radio node outputs, to the radio node in a group with which it has a connection, an after-disconnection state change notification including at least identification information on said arbitrary radio node of said plurality of radio nodes disconnected therefrom and the number of radio nodes connected as subordinates to said arbitrary radio node of said plurality of radio nodes disconnected therefrom. With this arrangement, even if a disconnection occurs, it is possible to correctly grasp the number of radio nodes in the group thereafter.

Yet moreover, the multi-hop radio system constructing method according to the present invention further can comprise a step in which, when said arbitrary radio node of said plurality of radio nodes which selects said host connection-accepting radio node and makes connection therewith is disconnected from said host connection-accepting radio node, said radio node disconnected from said host connection-accepting radio node outputs, to a radio node connected thereto as a subordinate, an after-disconnection connection change notification including its own identification information, identification information of a root node after the disconnection, a value obtained by subtracting the number of radio nodes connected thereto as subordinates from the total number of radio nodes included in the state information before the disconnection, and a value "1" indicative of the number of hops. With this arrangement, even if a disconnection occurs, it is possible to correctly grasp the number of radio nodes in the group including the radio nodes disconnected and separated.

In addition, in the multi-hop radio system constructing method according to the present invention, after the disconnection, said radio node disconnected can hold the identification information on said root node before the disconnection and, in selecting a new host connection-accepting radio node, can make a comparison between the held identification information on said root node before the disconnection and the identification information on said root node held in the radio node which is a candidate for said host connection-accepting radio node and, when they coincide with each other, can make a connection with the radio node which is the candidate for said host connection-accepting radio node on a preferential basis. With this arrangement, even if the radio node apparatus once falls into a disconnected state and immediately returns to the original condition, it is possible to maintain the tree without changing the connection arrangement.

Still additionally, the multi-hop radio system constructing method according to the present invention further can comprise a step in which said radio node disconnected therefrom operates as a root node of a new group. This arrangement enables a new group to be established while maintaining the tree structure even at disconnection.

Furthermore, in accordance with a further aspect of the present invention, there is provided a radio node apparatus for use in a tree-structured multi-hop radio system including a plurality of radio nodes, at least a portion of which is used as a repeater for carrying out multi-hop communication at layer 2, said radio node apparatus comprising: a transmission unit that broadcasts a state information acquiring request, used for selection of a host connection-accepting radio node, to said plurality of radio nodes, other than said radio node apparatus, each of which has state information including the total number of radio nodes connected to a tree-structured group with which each of said plurality of radio nodes has a connection, the number of hops from a root node positioned at a summit of said tree-structured group, identification information on said root node and its own identification information; a reception unit that receives the state information from said plurality of radio nodes node apparatus other than itself; and a control unit that makes a comparison between the total number of radio nodes included in the received state information and the total number of radio nodes included in its own state info illation to select radio nodes having the state information including the total number of the radio nodes larger than the total number of radio nodes included in its own states information and further to select and connect, of the selected radio nodes, a radio node having the smallest number of hops included in the state information as said host connection-accepting radio node. With this arrangement, it is possible to construct a tree type multi-hop radio system in which a root node is set as a root in an autonomous manner and further to make a connection with a group having more radio nodes for forming a group with more communicable radio nodes with high efficiency.

Still furthermore, in the radio node apparatus according to the present invention, only when this radio node apparatus is a root node of the group, the transmission unit can broadcast the state information acquiring request. This can minimize the variation of the tree structure at connection and disconnection.

Yet furthermore, in the radio node apparatus according to the present invention, in a case in which a connection is made as said host connection-accepting radio node, said reception unit can receive said state information transmitted from said radio node connected thereto, and said control unit can hold the total number of radio nodes included in the received state information for each of the radio nodes connected thereto. This arrangement facilitates the decision on the number of radio nodes changed at connection and disconnection, and makes smooth the management of the number of radio nodes in the entire group.

Moreover, in the radio node apparatus according to the present invention, in a ease in which a connection is made as said host connection-accepting radio node, said control unit can output, to the radio node in a group with which it has a connection, an after-connection state change notification including at least identification information on the radio node connected thereto and the total number of radio nodes included in said state information transmitted from said radio node connected thereto. This arrangement enables appreciating the number of radio nodes as the entire system even if changes of a plurality of connections (information) take place, and can prevent the double management from being done because of the distinguishing between the changes of a plurality of connections (information).

Still moreover, in the radio node apparatus according to the present invention, when making a selection as said host connection-accepting radio node and making a connection therewith, said reception unit can receive said state information transmitted from said host connection-accepting radio node and, on the basis of the received state information, said control unit can output, to the radio node connected thereto as a subordinate, an after-connection connection change notification including identification information on said root node after the connection, its own identification information, the total number of radio nodes included in the received state information and a value obtained by adding 1 to the number of hops included in the received state information. This arrangement can correctly notify a change to the radio nodes subject thereto when a root node is connected to a large group.

Yet moreover, in the radio node apparatus according to the present invention, in a case in which a disconnection takes place from the radio node which makes a selection as said host connection-accepting radio node and makes a connection therewith, said control unit can output, to the radio node in the group with which it has a connection, an after-disconnection state change notification including at least identification information on the radio node which has made the connection and disconnection and the number of radio nodes connected as subordinates to the radio node which has made the connection and disconnection. With this arrangement, even if a disconnection take place, it is possible to appreciate the number of radio nodes in the group thereafter.

In addition, in the radio node apparatus according to the present invention, in a case in which the radio node which has made a selection as said host connection-accepting radio node and a connection therewith makes a disconnection from said host connection-accepting radio node, said control unit can output, to a radio node connected as its own subordinate, an after-disconnection connection change notification including the identification information on this radio node which has made the disconnection, the identification information on said root node before the disconnection, a value obtained by subtracting the number of radio nodes connected as its own subordinates from the total number of radio nodes included in the state information before the disconnection and value "1" indicative of the number of hops. With this arrangement, it is possible to appreciate the number of radio nodes in the group including the radio node disconnected and separated therefrom.

Still additionally, in the radio node apparatus according to the present invention, in a case in which the radio node which has made a selection as said host connection-accepting radio node and a connection therewith is disconnected from said host connection-accepting radio node, said control unit can hold, after the disconnection, identification information on said root node before the disconnection in a predetermined storage region and, in selecting a new host connection-accepting radio node, can make a comparison between the held identification information on said root node before the disconnection and the identification information on said root node held in the radio node which is a candidate for the host connection-accepting radio node and, if they coincide with each other, can make a connection with the radio node which is the candidate for the host connection-accepting radio node on a preferential basis. With this arrangement, even if the radio node apparatus once falls into a disconnected state and immediately returns to the original condition, it is possible to maintain the tree without changing the connection arrangement.

Yet additionally, in the radio node apparatus according to the present invention, in a case in which the radio node which has made the selection as said host connection-accepting radio node and the connection therewith is disconnected from said host connection-accepting radio node, said control unit can make this radio node, disconnected, operate as a root node of a new group. With this arrangement, even at disconnection, it is possible to form a new group while maintaining the tree structure.

The radio node apparatus, multi-hop radio system and multi-hop radio system constructing method according to the present invention have the above-described arrangements, thus constructing a tree type multi-hop radio system in which radio nodes mutually determine a radio node which is a root node of a tree structure in an autonomous fashion so that the root node is set as a root in an autonomous fashion.

BRIEF DESCRIPTION OF THE DRAWINGS

FIG. 12 is an illustration useful for explaining a connection management table in the radio node apparatus according to the second embodiment of the present invention;

FIG. 13 is an illustration useful for explaining a state change notification in the radio node apparatus according to the second embodiment of the present invention;

FIG. 17A is an illustration of a state before a group is formed to make ad hoc communications in a conventional radio system;

FIG. 17B is an illustration of a state after the formation of the group for the ad hoc communications in the conventional radio system;

DESCRIPTION OF THE PREFERRED EMBODIMENTS (First Embodiment)

Figure 1:
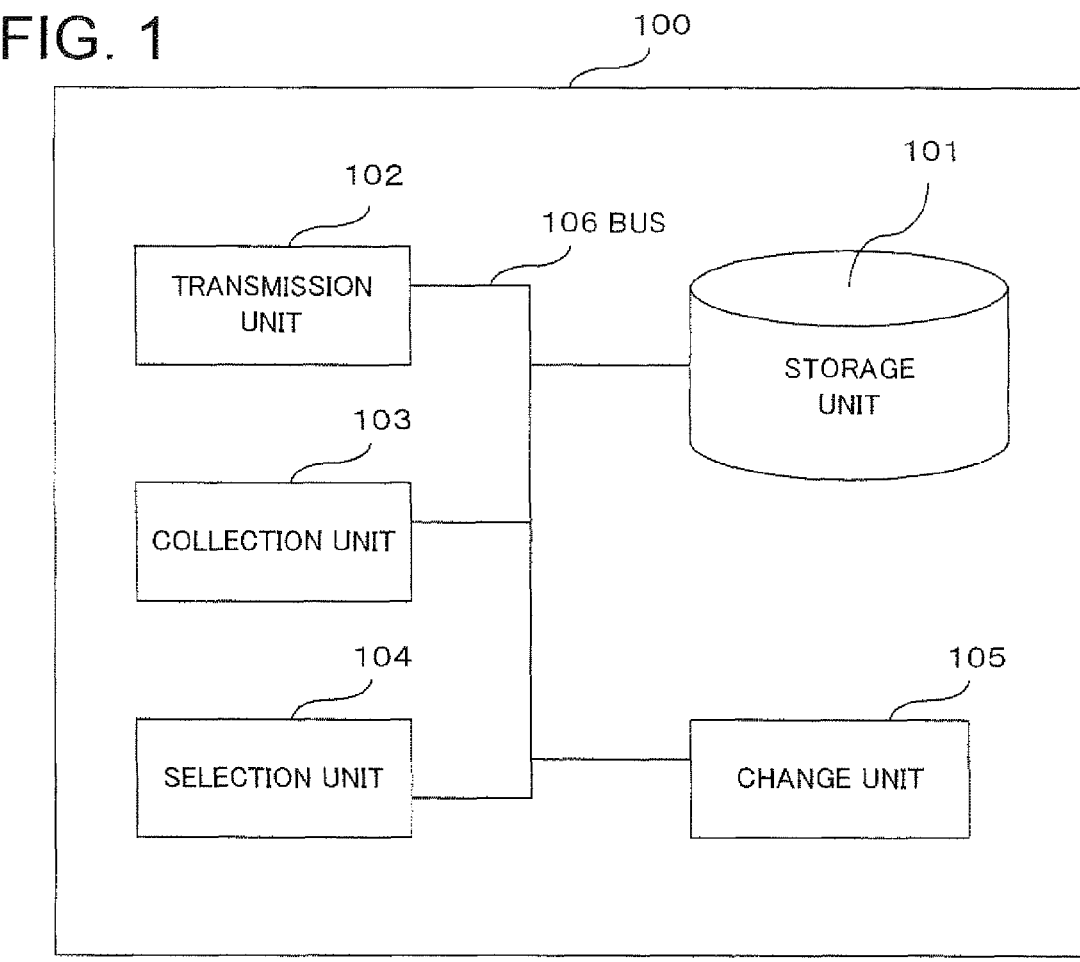
FIG. 1 is an illustration of a configuration of a radio node apparatus according to a first embodiment of the present invention.
Figure 2:
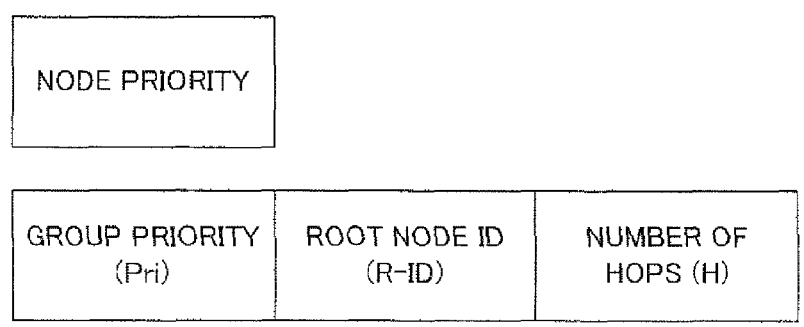
FIG. 2 is an illustration useful for explaining state information and node priority in the radio node apparatus according to the first embodiment of the present invention.
Figure 3:
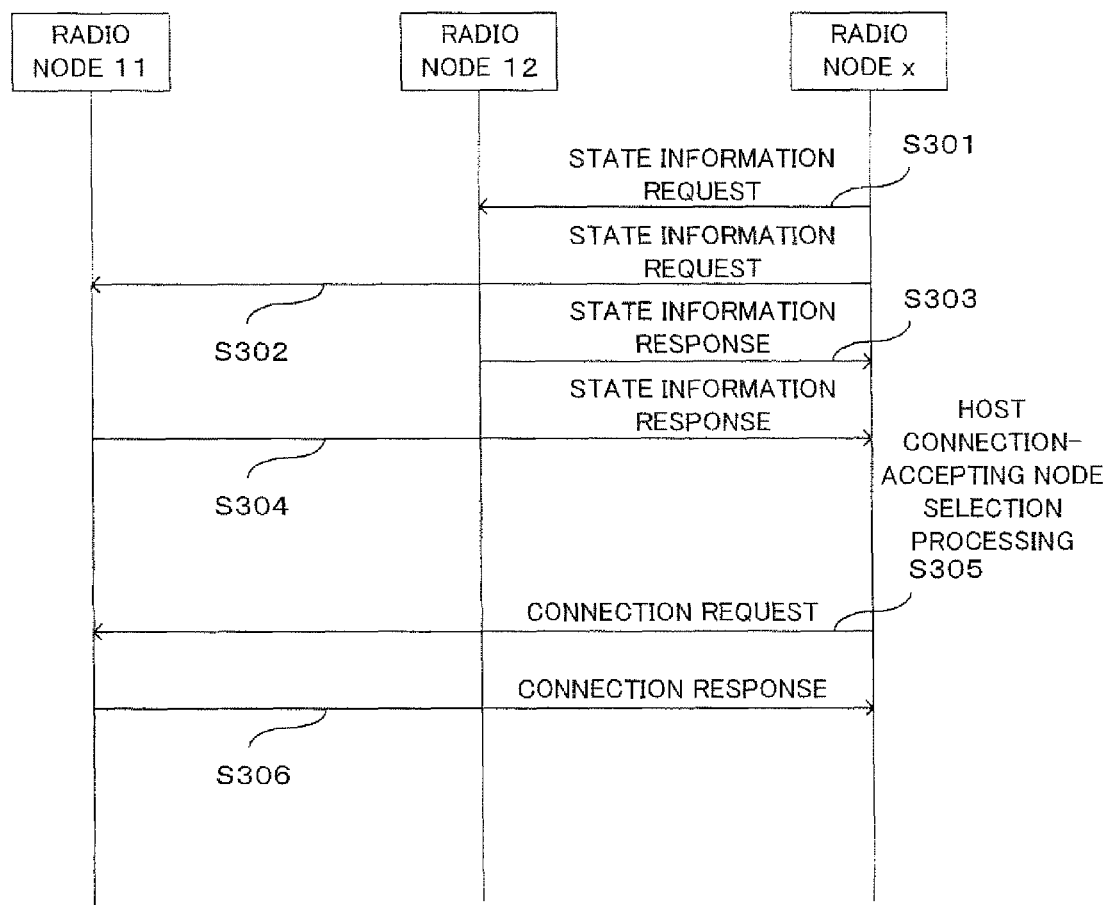
FIG. 3 is a flow chart useful for explaining a sequence of selecting and connecting a host connection-accepting radio node apparatus, in the radio node apparatus according to the first embodiment of the present invention.
Figure 4:
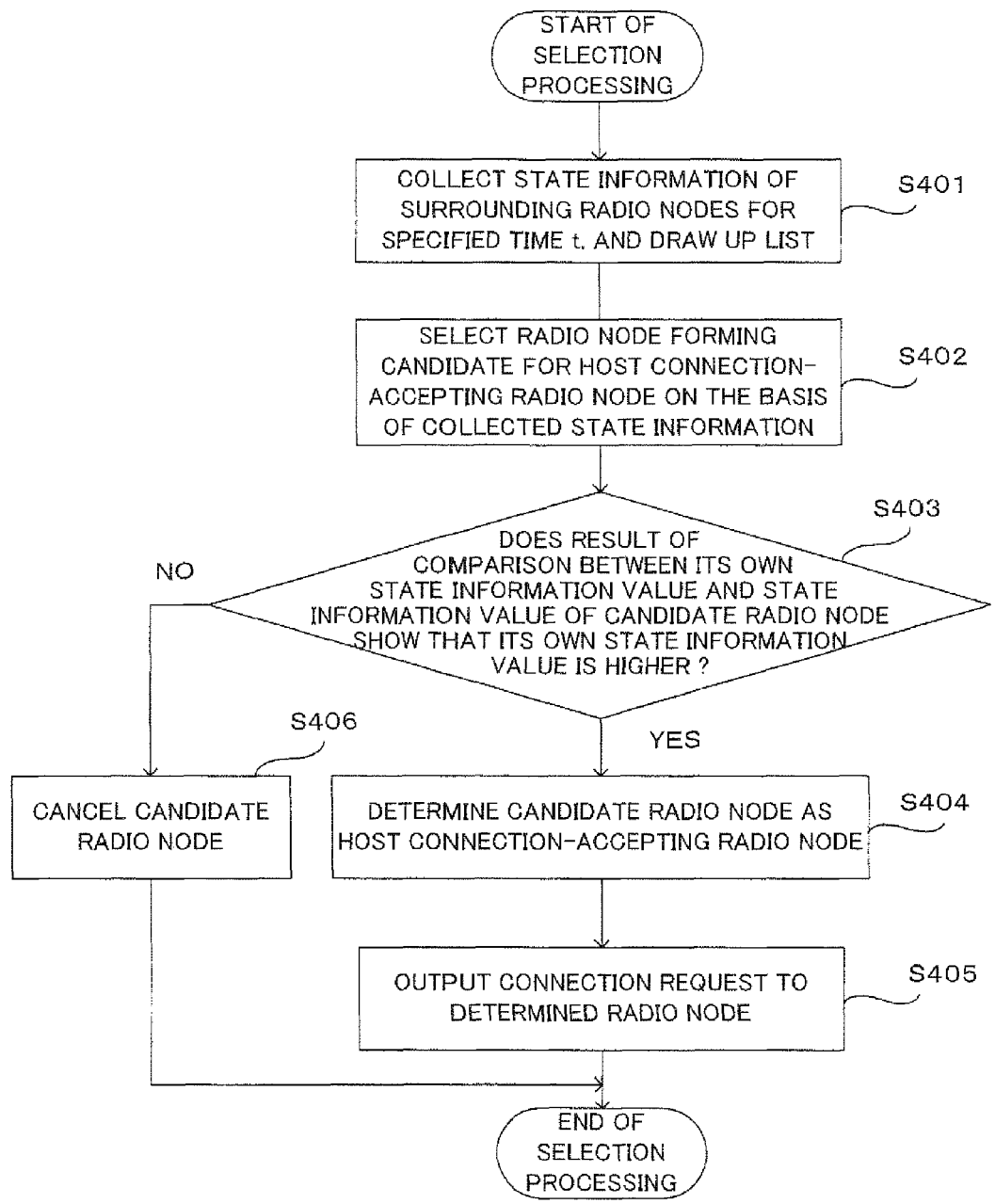
FIG. 4 is a flow chart for explaining a host connection-accepting radio node selection processing flow in the radio node apparatus according to the first embodiment of the present invention.
Figure 5A:
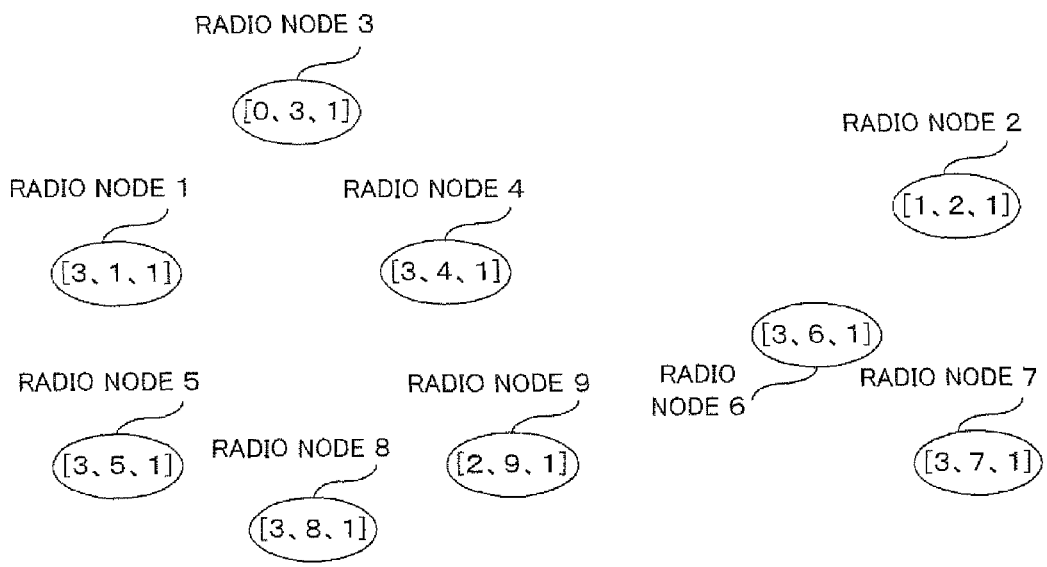
FIG. 5A is an illustration of a state before the construction of a multi-hop radio system according to the first embodiment of the present invention.
Figure 5B:
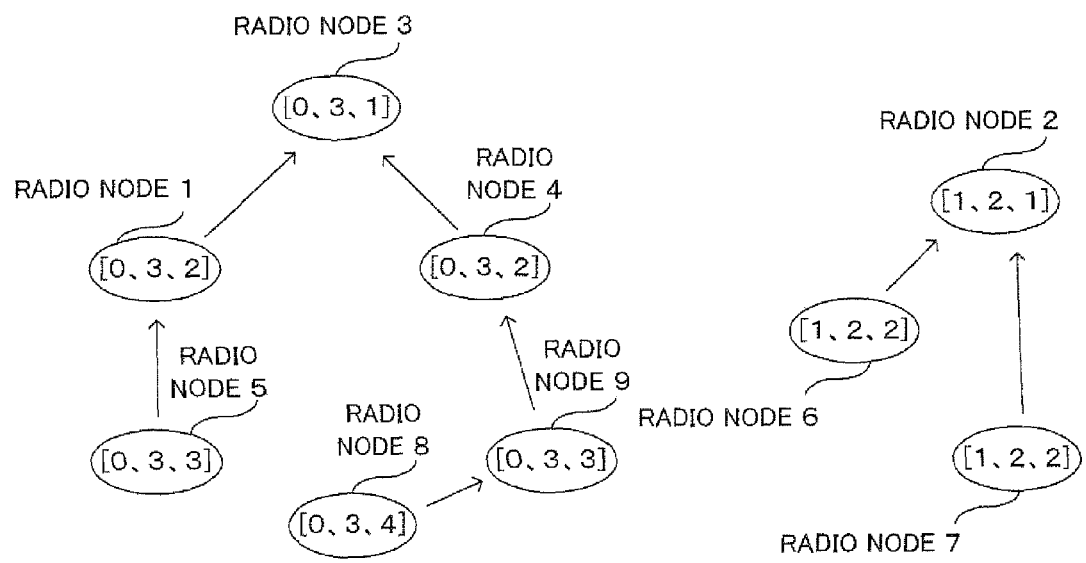
FIG. 5B is an illustration of a state after the construction of a multi-hop radio system according to the first embodiment of the present invention.
Figure 6A:
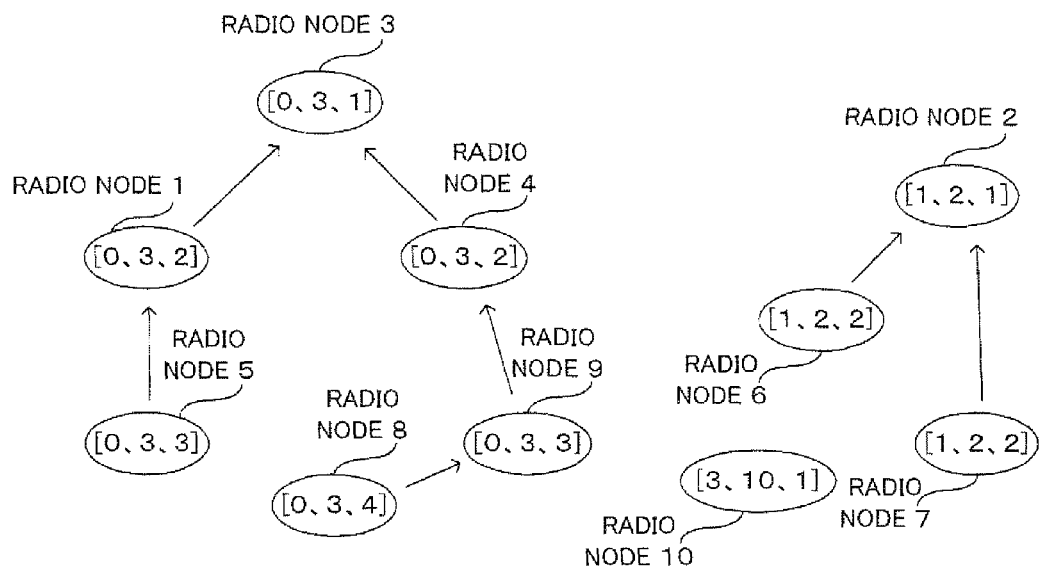
FIG. 6A is an illustration of a state in which a different radio node apparatus is activated after the construction of a multi-hop radio system according to the first embodiment of the present invention.
Figure 6B:
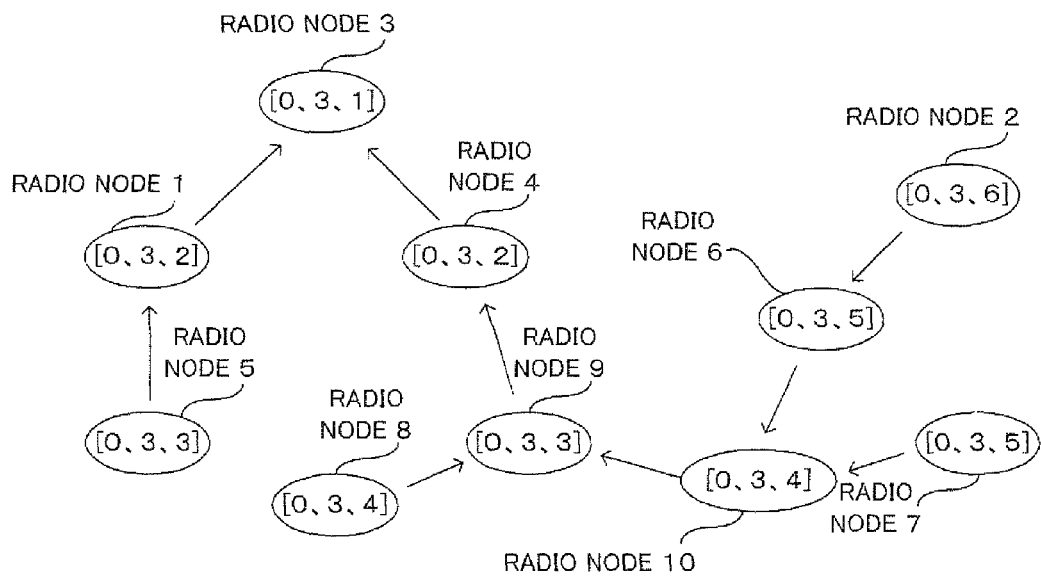
FIG. 6B is an illustration of a state in which a different radio node apparatus is activated after the construction of a multi-hop radio system according to the first embodiment of the present invention so as to construct one multi-hop radio system.

Referring to FIGS. 1 to 6A and 6B, a description will be given hereinbelow of a radio node apparatus and multi-hop radio system according to a first embodiment of the present invention. FIG. 1 is an illustration of a configuration of a radio node apparatus according to a first embodiment of the present invention, and FIG. 2 is an illustration useful for explaining state information and node priority in the radio node apparatus according to the first embodiment of the present invention. FIG. 3 is a flow chart useful for explaining a sequence of selecting and connecting a host connection-accepting radio node apparatus, in the radio node apparatus according to the first embodiment of the present invention, and FIG. 4 is a flow chart for explaining a host connection-accepting radio node selection processing flow in the radio node apparatus according to the first embodiment of the present invention. FIG. 5A is an illustration of a state before the construction of a multi-hop radio system according to the first embodiment of the present invention, and FIG. 5B is an illustration of a state after the construction of the multi-hop radio system according to the first embodiment of the present invention. FIG. 6A is an illustration of a state in which a different radio node apparatus is activated after the construction of a multi-hop radio system according to the first embodiment of the present invention, and FIG. 6B is an illustration of a state in which a different radio node apparatus is activated after the construction of a multi-hop radio system according to the first embodiment of the present invention so as to construct one multi-hop radio system.

First of all, referring to FIG. 1, a description will be given hereinbelow of a configuration of a radio node apparatus according to the first embodiment of the present invention. As FIG. 1 shows, a radio node apparatus, generally designated at reference numeral 100, is made up of a storage unit 101, a transmission unit 102, a collection unit 103, a selection unit 104 and a change unit 105, these components are connected to each other through a bus 106. In addition, the radio node apparatus 100 is equipped with an interface (not shown) which is for establishing communications with the external. Still additionally, the radio node apparatus 100 has a control program in a state stored in, for example, the storage unit 101. This storage unit 101 is equivalent to an HDD, ROM, RAM or the like. The transmission unit 102, the collection unit 103, the selection unit 104 and the change unit 105 correspond to, for example, a CPU.

The storage unit 101 stores, for constructing a tree-structured multi-hop radio system, a node priority on employment as a root radio node apparatus (which will hereinafter be referred to equally as a "root node"), a group priority indicative of a connection priority of a group with which it has a connection, information for specifying a root node of a multi-hop radio system with which it has a connection, and the number of hops from a root node. The information on the group priority, the root node specifying information and the number of hops from the root node will be referred to equally as "state information". Referring to FIG. 2, a description will be given hereinbelow of the respective information stored in the storage unit 101. For the selection of a host connection-accepting radio node apparatus (which will hereinafter be equally referred to simply as a "radio node"), the radio node apparatus according to the first embodiment of the present invention employs a group priority (Pri), a root node ID (R-ID) which forms information for specifying a root node of a multi-hop radio system with which it has a connection, and the number (H) of hops from the root node. As shown in FIG. 2, these values are held in descending order of bit-order, i.e., in the order of the group priority, the root node ID and the number of hops. They are handled as one numerical value and this value is handled as a state information value. In addition to these values, a node priority for this node to become a root node is also held in a separate state.

A value indicative of a priority on connection as a root node is set at the node priority and the root node can be set artificially. In particular, although restriction is not imposed on the size (number of bits), in the radio node apparatus 100 according to the first embodiment of the present invention, for convenience of explanation only, values of two bits are taken, and 0 signifies a high priority while 3 represents a low priority. Moreover, any root node ID can be taken if it is a value unique to a radio node, and in the radio node apparatus 100 according to the first embodiment of the present invention, an MAC address of the radio node is put to use. As the number of hops, 1 is allocated to a root node, and it is incremented by 1 at every hop. As the initial values, the node priority stands at a value set in each radio node, the group priority stands at the node priority, the root node ID is set as its own MAC address, and the number of hops (which will hereinafter be referred to equally as "hop number") is set as H=1.

For selection of host connection-accepting (connected-to) radio node (which is an object of connection), the transmission unit 102 transmits an acquisition request (which will hereinafter be referred to equally as a "state information request") to surrounding radio nodes around it for a group priority, a root node ID and the hop number (number of hops) which are held in each of the surrounding radio nodes. With reference to FIG. 3, a description will be given hereinbelow of a basic sequence of transmitting a state information request, receiving a response (hereinafter referred to equally as a "state information response") to the state information request, selecting a host connection-accepting radio node on the basis of the received state information response and making a connection with the selected radio node.

As FIG. 3 shows, a radio node x broadcasts a state information request when activated (steps S301 and S302). Upon receipt of this state information request, each of radio nodes 11 and 12 makes a response as the state information response, that is, it send its own state information to the radio node x (steps S303 and 304). The radio node x conducts processing for selection of a host connection-accepting radio node on the basis of the received state information response. The radio node x makes a connection request to the selected radio node 11 (step S305) and receives a connection response to this request (step S306). Thus, the connection to the host connection-accepting radio node 11 reaches completion. Let it be assumed that the above-mentioned host connection-accepting radio node selection processing is conducted not only at the activation but also periodically.

The collection unit 103 collects the group priority, the root node ID and the hop number transmitted from each of the surrounding radio nodes in accordance with the transmitted state information request. As a method of collecting the state information, although this embodiment employs the above-mentioned method in which the transmission unit 102 broadcasts a state information request and receives a state information response thereto, it is also appropriate to employ a method in which surrounding radio nodes periodically broadcast state information in the form of beacon and the collection unit 103 receives and collects them. Moreover, the collection unit 103 collects the state information, for example, for a specified period of time t and lists them.

The selection unit 104 selects a host connection-accepting radio node on the basis of the group priorities, root node IDs and hop numbers collected in this way. With reference to FIG. 4, a description will be given hereinbelow of host connection-accepting radio node selection processing in the selection unit 104. First, the collection unit 103 collects and lists the state information from surrounding radio nodes for the prescribed time period t (step S401). The selection unit 104 selects radio nodes which are candidates for a host connection-accepting radio node, on the basis of the collected state information (step S402). A description will be given hereinbelow of a concrete method of selecting candidate radio nodes.

A comparison is made between the state information values to select the radio node having the smallest value. That is, the radio node whose group priority, set at high-order bits, is high, i.e., the radio node whose group priority Pri stands at the smallest value, is set as a candidate on a preferential basis. In a case in which there are pluralities of radio nodes having the smallest group priority Pri, the radio node connected to a tree based on a root node having the smallest value in terms of root node ID is set as a candidate. If the selection of the candidate radio node is nonetheless unfeasible, of the radio nodes connected to the same root node, the radio node having the smallest number of hops is selected as a candidate for a host connection-accepting radio node. Incidentally, if the hop number still cannot solve the problem of the selection of the radio node which is a candidate for the host connection-accepting radio node, one of the radio nodes can be selected on the basis of the strength of the reception of the state information response or a comparison between frame transmission-requesting MAC addresses at the reception of the state information response. Moreover, if there is neither group priority nor node priority, the radio node connected to a tree based on a root node having the smallest root node ID value is set as a candidate. If the selection of the candidate radio node is still difficult, of the radio nodes connected to the same root node, the radio node having the smallest number of hops is selected as the candidate for the host connection-accepting radio node.

In a case in which a radio node is selected as a candidate for the host connection-accepting radio node in the step S402, the selection unit 104 makes a comparison between its own state information value (group priority, root node ID, hop number) and the state information value (group priority, root node ID, hop number) held in the radio node which is the candidate for the host connection-accepting radio node so as to make a decision as to whether or not its own state information value exceeds the value of the radio node which is the candidate for the host connection-accepting radio node (step S403). If so (that is, in a case in which the other side connection priority is higher than its own connection priority), the radio node which is the candidate for the host connection-accepting radio node is determined as the host connection-accepting radio node (step S404). Moreover, a connection request is issued to the determined host connection-accepting radio node (step S405). Upon receipt of a connection response to the effect that the connection is possible with respect to the connection request, the aforesaid change unit 105 changes, of its own state information value, the group priority and the root node ID to those of the host connection-accepting radio node and changes the hop number to a value obtained by adding 1 to the hop number of the host connection-accepting radio node. On the other hand, if the decision in the step S403 shows that its own value is not larger than the value of the radio node which is the candidate for the host connection-accepting radio node, the radio node set as the candidate for the host connection-accepting radio node is removed from the candidate and abandoned (step S406), and the selection processing comes to an end. Incidentally, the above-mentioned "exceed a predetermined comparison reference" signifies that, for example, when a comparison is made between its own state information value (group priority, root node ID, hop number) and the state information value (group priority, root node ID, hop number) held in the radio node which is the candidate for the host connection-accepting radio node, its own state information is larger than the value of the candidate for the host connection-accepting radio node. Moreover, if no group priority and node priority exist, a comparison is made in terms of the root node ID and the hop number.

Since, as mentioned above, the connection is preferentially made in accordance with priority in a state where the node priority of the radio node which serves as a root node is set as a group priority, an aggregation is made as a tree based on a root node having a high node priority. Moreover, even in the case of a fully independent group, in this group, a root node is determined on the basis of the group priority and the root node ID in an autonomous fashion so that an independent tree is constructible and operable. Still moreover, even if there is no setting of priority, a root node can be selected in an autonomous fashion through the comparison between the root node IDs so as to construct a tree.

Secondly, referring to FIGS. 5A and 5B, a description will be given hereinbelow of an arrangement for the construction of a multi-hop radio system through the use of the radio node apparatus and multi-hop radio system according to the first embodiment of the present invention. FIG. 5A is an illustration of a state in which each of radio nodes 1 to 9 is initialized in state information and is put into activation. FIG. 5B is an illustration of a multi-hop radio system constructed after the activation of the radio nodes 1 to 9. In FIGS. 5A and 5B, the numerals given with respect to the respective radio nodes designate state information in the order of "Pri, R-ID, H".

In FIG. 5A, since its own node priority is used as the group priority in the initial state, the radio node 3 has a node priority 0 which is the highest priority, and the next highest priority is the node priority 1 of the radio node 2, and next in priority is the node priority 2 of the radio node 9. The other radio nodes show the node priority 3. In the following description, with respect to root node ID, the number of the radio node is used as its own ID. Moreover, the initial values of all the hop numbers are set as H=1. After activated, each of the radio nodes collects state information. Thus, of the radio nodes directly connectable to itself, the radio node having a highest group priority (smallest numerical value), a low root node ID and a small hop number is selected and connected thereto. In consequence, on the side where the radio nodes 1, 3, 4, 5, 8 and 9 converge (hereinafter referred to equally as a "group A"), the radio node 3 has the highest priority and, hence, an aggregation is made to construct a tree in which the radio node 3 is set as the root node.

The state information of each of the radio nodes in the group A is changed to the group priority Pri=0 and to the root node ID R-ID=3. Moreover, in a case in which three radio nodes on the side where the radio nodes 2, 6 and 7 converge (hereinafter referred to equally as a "group B") cannot be connected to a tree in which the radio node 3 is used as a root node, a different independent tree is formed. In the group B, the radio node 2 has the highest priority so that a tree is structured in a state where the radio node 2 forms a root node, and the state information is changed to the group priority Pri=1 and to the root node ID R-ID=2. Thus, each radio node independently determines a root node and a group are formed among the radio nodes connectable to each other, thereby constructing an ad hoc multi-hop radio system.

Furthermore, referring to FIGS. 6A and 6B, a description will be given hereinbelow of an arrangement whereby a radio node 10 is newly activated so that the multi-hop trees of the two groups A and B are aggregated into one. FIG. 6A is an illustration of a state in which, in the state shown in FIG. 5B, the radio node 10 is activated at a position connectable to the radio node 9 and the radio node 6,7. FIG. 6B is an illustration of a multi-hop radio system constructed after the activation of the radio node 10. In FIG. 6A, when activated, the radio node 10 outputs a state information request, and each of the radio nodes 6, 7 and 9 makes a response thereto. In this case, when a comparison is made between the state information, since the radio node 9 shows Pri=0, the radio node 10 has a connection with the radio node 9 and changes its own state information to [0, 3, 4].

Following this, at the periodical updating of the radio nodes 6 and 7, the radio nodes 6 and 7 recognize that they are connectable to the radio node 10 holding the state information [0, 3, 4] lower in group priority Pri than their own state information [1, 2, 2], and make a connection with the radio node 10. Thus, the radio node 2 is connected to the radio node 6. When multi-hop radio systems, which are in a separated condition from each other, become connectable to each other in this way, a connection to a tree based on a root node having a higher priority takes place through the use of the state information. Therefore, when the group priorities of the radio nodes connected to an external network are set at a higher value, the radio nodes can aggregate into a tree connected to the external.

(Second Embodiment)

Figure 7:
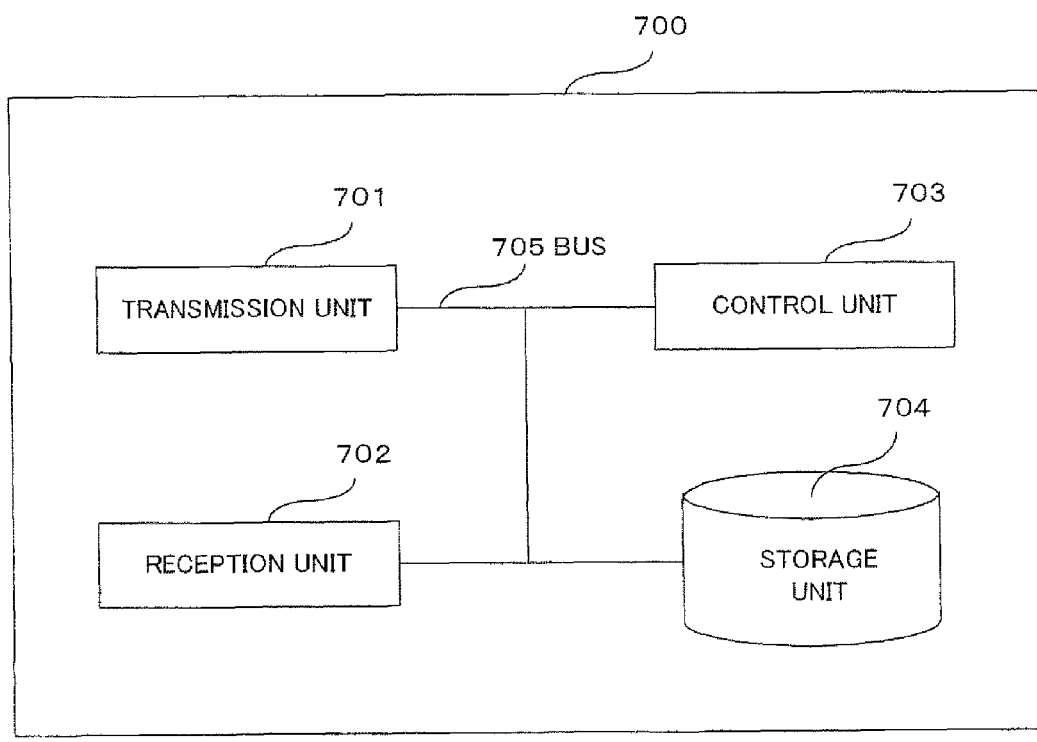
FIG. 7 is an illustration of a configuration of a radio node apparatus according to a second embodiment of the present invention.
Figures 8, 9:
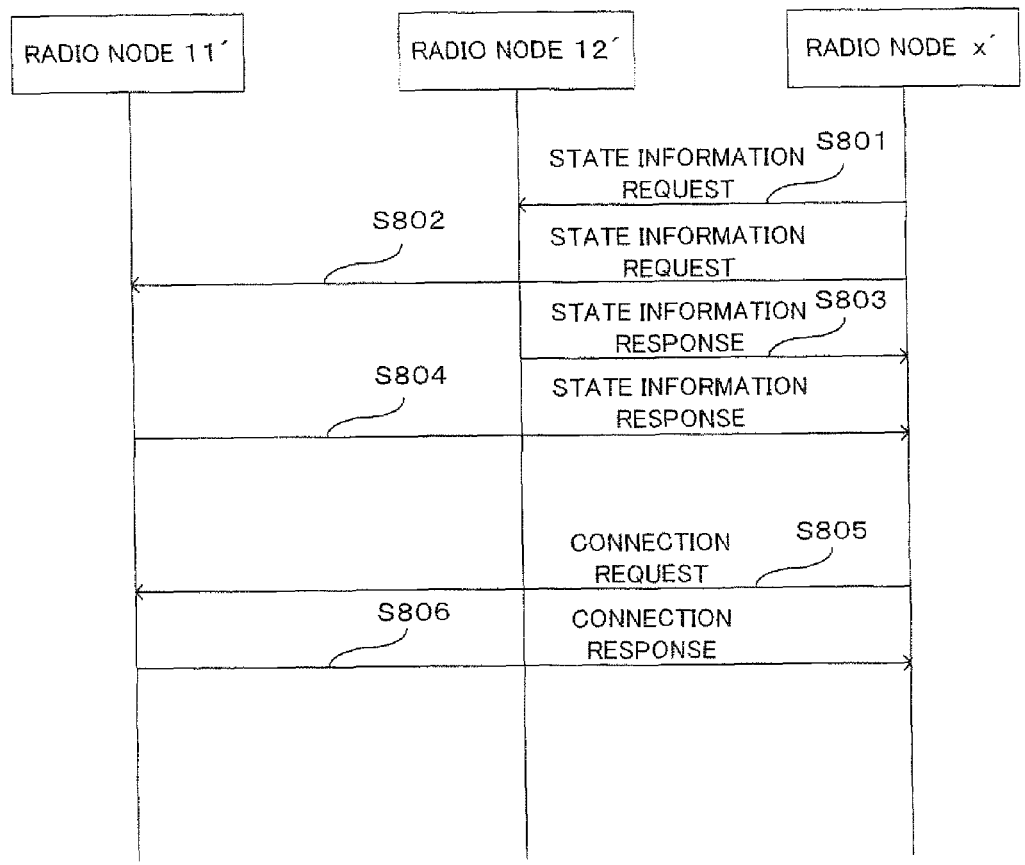
FIG. 8 is a sequence chart useful for explaining a sequence in which the radio node apparatus according to the second embodiment of the present invention selects a host connection-accepting radio node apparatus.
FIG. 9 is an illustration useful for explaining state information in the radio node apparatus according to the second embodiment of the present invention.
Figure 10:
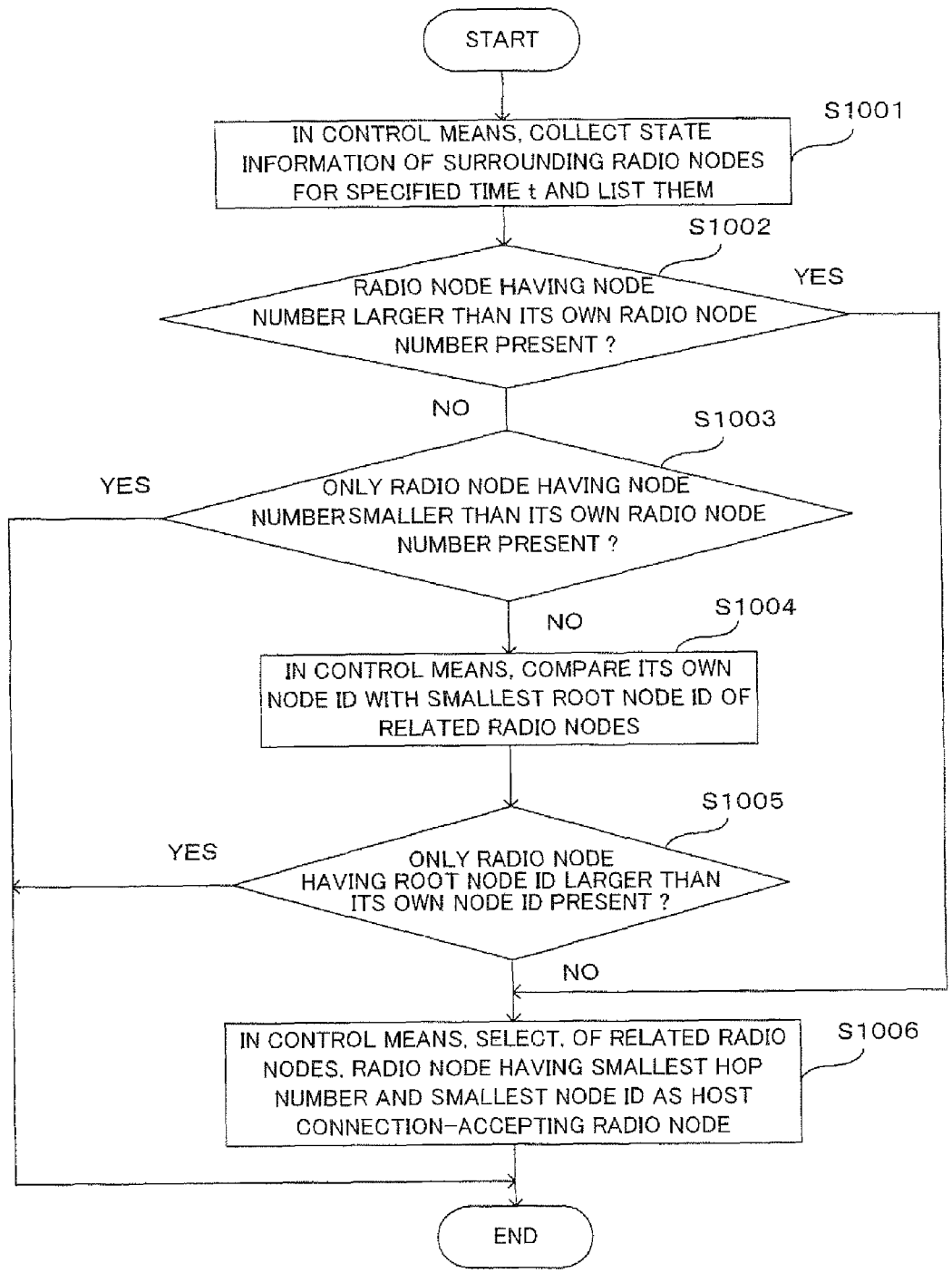
FIG. 10 is a flow chart for explaining a host connection-accepting radio node selection processing flow in the radio node apparatus according to the second embodiment of the present invention.

Referring to FIGS. 7 to 16, a description will be given hereinbelow of a multi-hop radio system constructing method and radio node apparatus according to a second embodiment of the present invention. FIG. 7 is an illustration of a configuration of a radio node apparatus according to a second embodiment of the present invention. FIG. 8 is a sequence chart useful for explaining a sequence in which the radio node apparatus according to the second embodiment of the present invention selects a host connection-accepting radio node apparatus. FIG. 9 is an illustration useful for explaining state information in the radio node apparatus according to the second embodiment of the present invention. FIG. 10 is a flow chart for explaining a host connection-accepting radio node selection processing flow in the radio node apparatus according to the second embodiment of the present invention.

Figure 11:
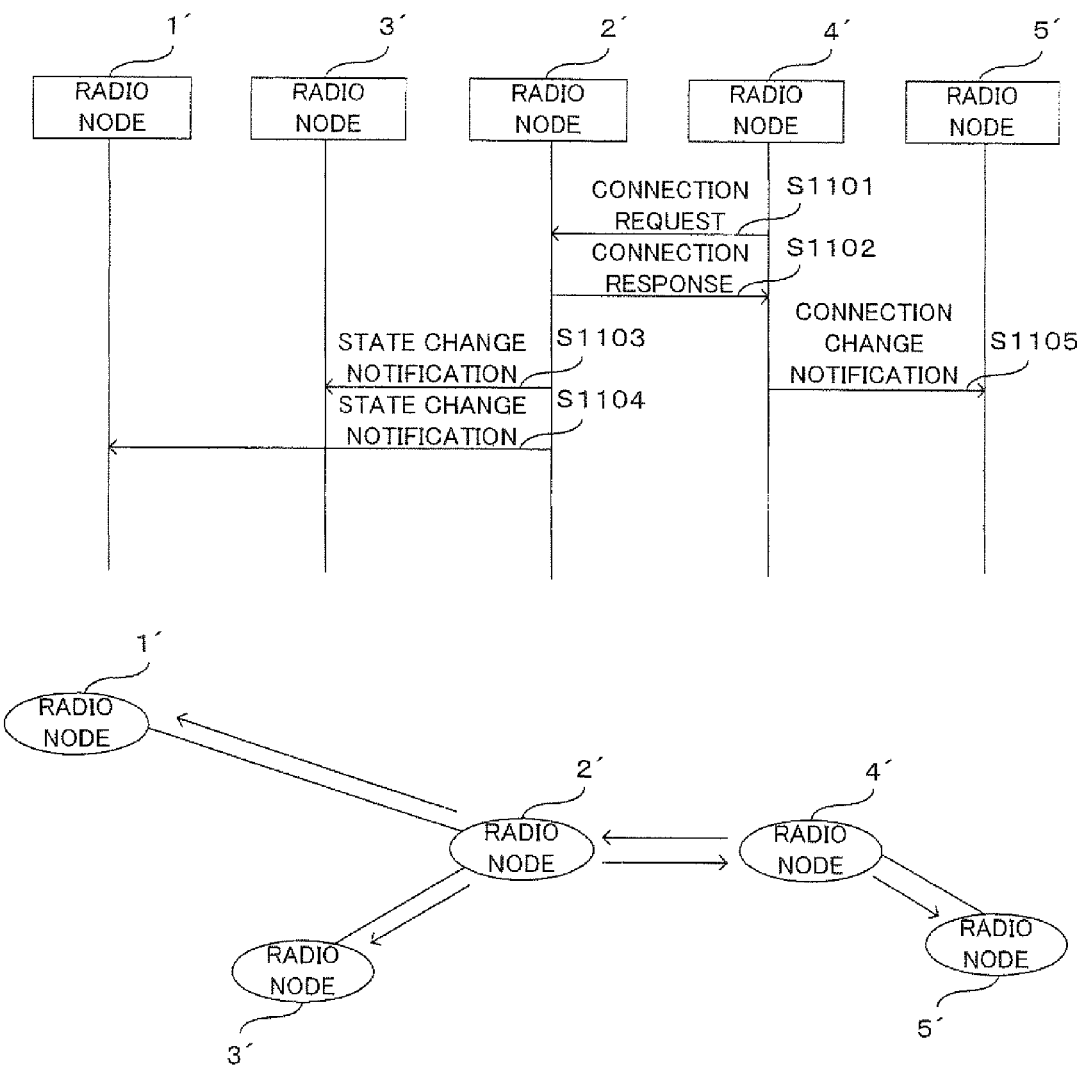
FIG. 11 is a sequence chart useful for explaining state information change processing in the radio node apparatus according to the second embodiment of the present invention, and is a conceptual illustration thereof.
Figure 14:
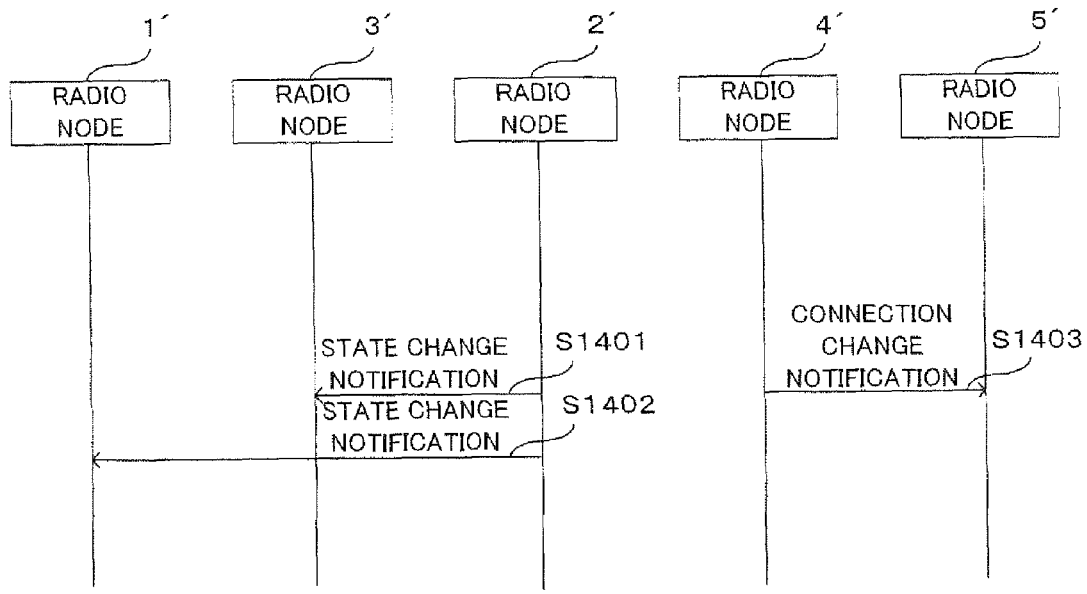
FIG. 14 is a sequence chart useful for explaining state information change processing at disconnection of a radio link in the radio node apparatus according to the second embodiment of the present invention, and is a conceptual illustration thereof.
Figure 15:
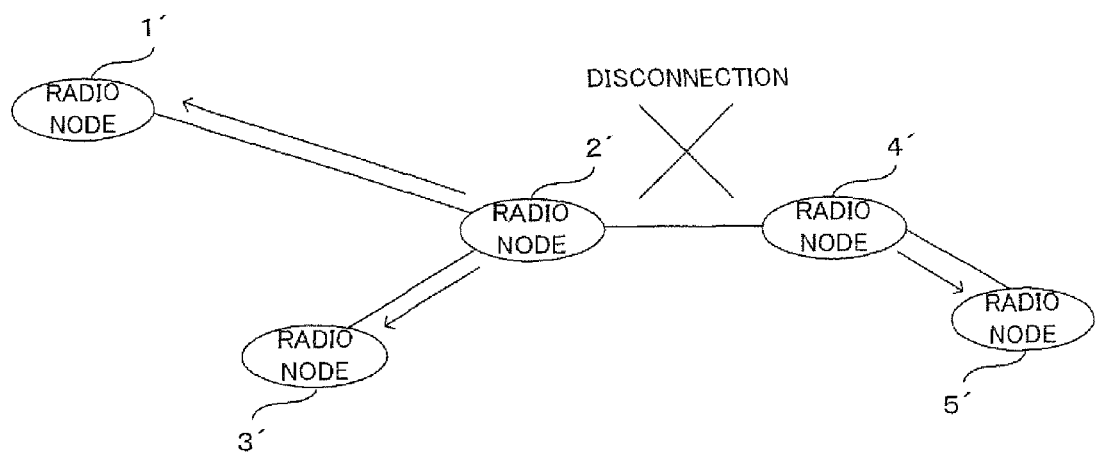
FIG. 15 is an illustration useful for explaining a connection change notification in the radio node apparatus according to the second embodiment of the present invention.
Figure 16:
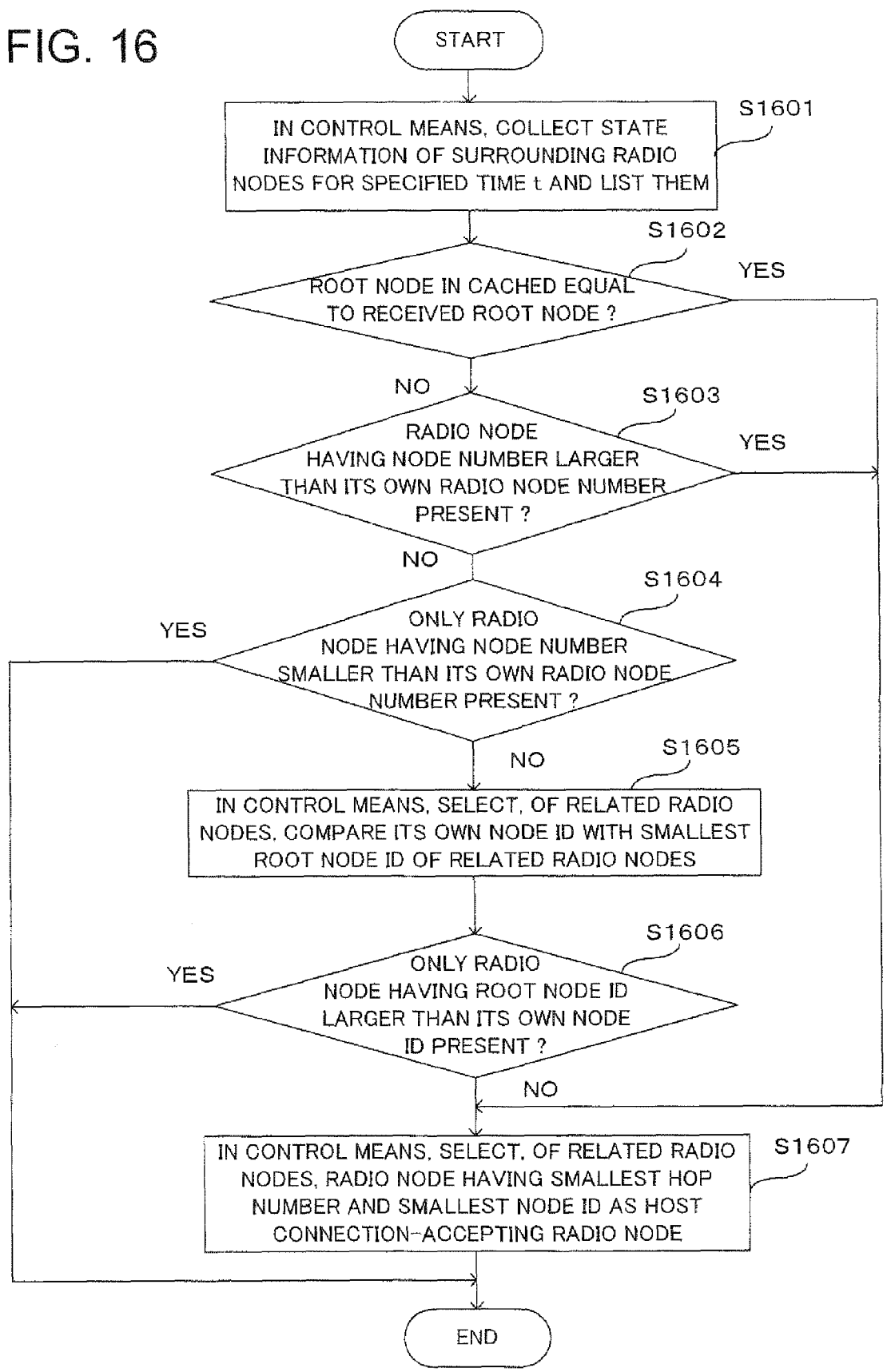
FIG. 16 is a flow chart for explaining a different host connection-accepting radio node selection processing flow in the radio node apparatus according to the second embodiment of the present invention.
Figure 18A:
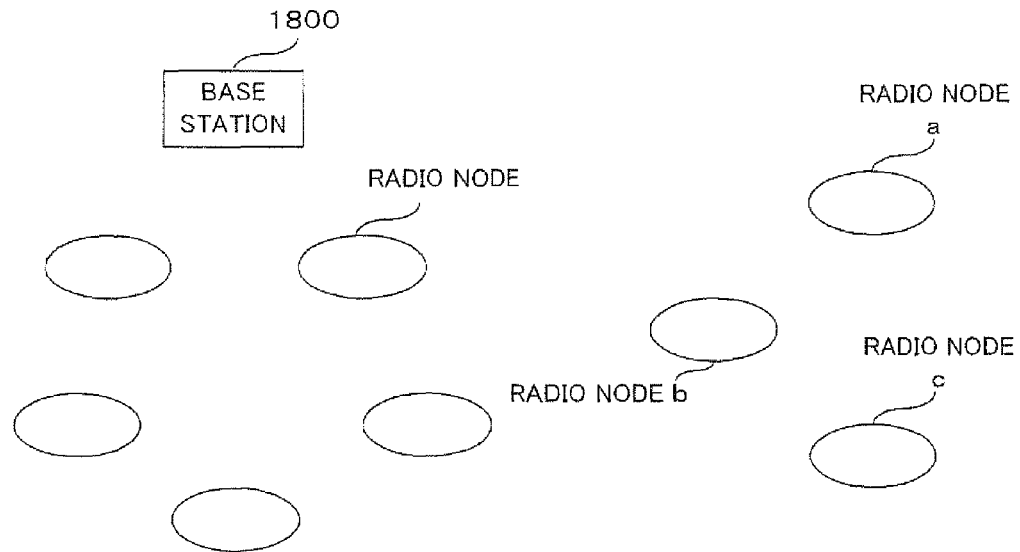
FIG. 18A is an illustration of a state before the construction of a conventional multi-hop radio network.
Figure 18B:
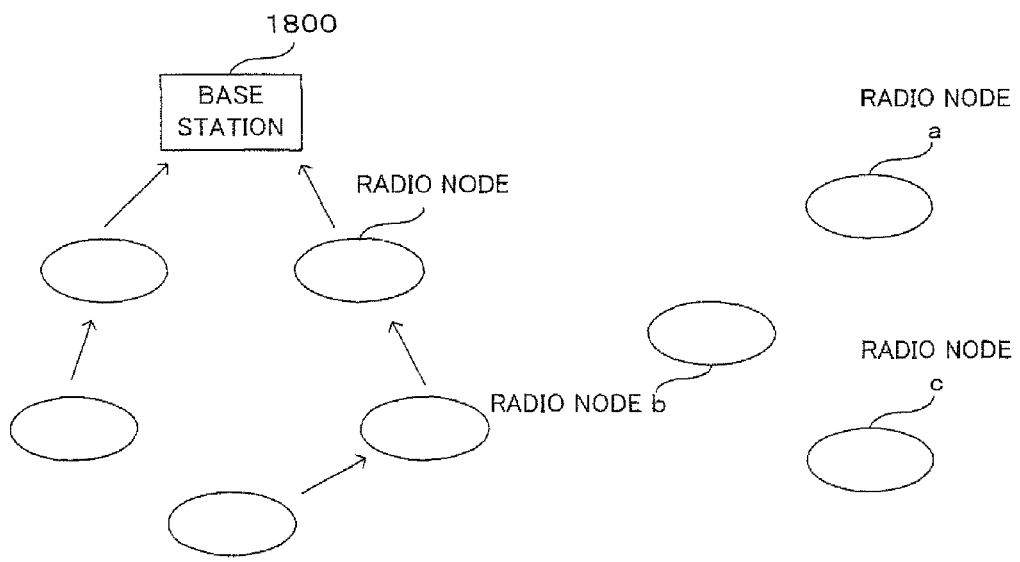
FIG. 18B is an illustration of a state after the construction of the conventional multi-hop radio network.

FIG. 11 is a sequence chart useful for explaining state information change processing in the radio node apparatus according to the second embodiment of the present invention, and is a conceptual illustration thereof. FIG. 12 is an illustration useful for explaining a connection management table in the radio node apparatus according to the second embodiment of the present invention. FIG. 13 is an illustration useful for explaining a state change notification in the radio node apparatus according to the second embodiment of the present invention. FIG. 14 is a sequence chart useful for explaining state information change processing at disconnection of a radio link in the radio node apparatus according to the second embodiment of the present invention, and is a conceptual illustration thereof. FIG. 15 is an illustration useful for explaining a connection change notification in the radio node apparatus according to the second embodiment of the present invention. FIG. 16 is a flow chart for explaining a different host connection-accepting radio node selection processing flow in the radio node apparatus according to the second embodiment of the present invention.

First, referring to FIG. 7, a description will be given hereinbelow of a configuration of a radio node apparatus according to the second embodiment of the present invention. As shown in FIG. 7, a radio node apparatus 700 is made up of a transmission unit 701, a reception unit 702, a control unit 703 and a storage unit 704. They are connected through a bus 705 to each other. Moreover, the radio node apparatus 700 is equipped with an interface (not shown) which is for establishing communications with the external. Still additionally, in the radio node apparatus 700, a program for controlling the radio node apparatus 700 is stored in the storage unit 704. The transmission unit 701, the reception unit 702 and the control unit 703 correspond to, for example, a CPU. The storage unit 704 is equivalent to an HDD, ROM, RAM or the like. The function of each of the parts will be described later.

Furthermore, referring to FIG. 8, a description will be given hereinbelow of a sequence to be conducted when the radio node apparatus according to the second embodiment of the present invention selects a host connection-accepting radio node. A radio node x' which tries to make a connection with a host connection-accepting radio node broadcasts a state information request (steps S801 and 802). A description of the state information will be given later. Upon receipt of this state information request, each of the radio nodes 11' and 12' transmits its own state information to the radio node x' (steps S803 and 804). The radio node x' receives the state information from the radio nodes 11' and 12' and selects a host connection-accepting radio node-on the basis of the received state information and issues a connection request to the selected radio node 11' (step S805) to receive a response thereto (step S806), thus achieving the connection with the host connection-accepting radio node 11'.

For example, the radio node x' making the state information request is a radio node which is still in a non-connected condition after activated and a root node after a formation of a tree of an ad hoc group, and the radio node x' issues the state information request periodically. In this case, the radio node which is still in a non-connected condition after activated operates as a root node of a group comprising only one radio node. Moreover, with respect to the response to the state information request, the radio node which has received the state information request makes the response without distinguishing between the root node and the other radio nodes.

The above-mentioned state information will be described hereinbelow with reference to FIG. 9. In the second embodiment of the present invention, the state information to be used at the selection of a host connection-accepting radio node is composed of a node number (N) indicative of the total number of radio nodes in a group based on a root node and formed in an ad hoc fashion, a hop number (H) from the root node, a root node ID (R-ID) indicative of a radio node which is a root node in a group to which it pertains, and a node ID (N-ID) which is a unique value representative of itself. With respect to the hop number, the root node is set as 1, and it is incremented by 1 at every hop. With respect to the state information, the initial values are such that node number (N)=1, hop number (H)=1, and root node ID (R-ID)=node ID (N-ID). In this case, an MAC address of that apparatus or the like can be employed as the node ID (N-ID).

Furthermore, referring to FIG. 10, a description will be given hereinbelow of the processing of selecting a host connection-accepting radio node apparatus, which is conducted in a radio node apparatus according to the second embodiment of the present invention. The transmission unit 701 of the radio node (radio node apparatus) 700 broadcasts a state information request to, for example, surrounding radio nodes around it, and the reception unit 702 of the radio node 700 receives the state information therefrom for a specified period of time t so that, on the basis of the received state information, the control unit 703 of the radio node 700 collects and lists the state information of the surrounding radio nodes (step S1001). After listing the state information, the control unit 703 makes a comparison between the node number (number of nodes) in the state information of the radio node 700 and the node number included in the listed state information so as to make a decision as to whether or not there is a radio node having the node number larger than the node number of the state information (its own state information) of the radio node 700 (step S1002). If there is a radio node having a larger node number, the operational flow advances to a step S1006 to be mentioned later. If there is no radio node having a larger node number, the control unit 703 makes a decision as to whether or not there exist only radio nodes having a node number smaller than the node number in the state information of the radio node 700 (step S1003).

If there exist only a radio node(s) having a node number smaller than the node number in the state information of the radio node 700, that is, when the radio node 700 is a root node covering many radio nodes as subordinates, the operational flow comes to an end without making a connection to the other radio node. On the other hand, if there is a radio node other than the radio nodes having a node number smaller than the node number in the state information of the radio node 700, that is, when there is a radio node having the same radio node number as that of the radio node 700, the control unit 703 makes a comparison between the node ID included in the state information of the radio node 700 and the smallest root node ID in the related radio nodes (step S1004). In this ease, with respect to the comparison between IDs, the MAC addresses of the apparatus are used as the IDs and, therefore, the comparison can be made between numerical values.

The control unit 703 makes a decision, on the basis of a result of the comparison, as to whether or not there exists only a radio node(s) having a root node ID larger than the node ID (its own node ID) of the radio node 700 (step S1005). If a decision is made that there exists only a radio node(s) having a root node ID larger than the node ID of the radio node 700, the operational flow comes to an end without making a connection to the other radio node. Thus, in a case in which groups having the same scale approach each other, it is possible to distinguish between the connecting side and the connected side according to the magnitude of the root node ID. Moreover, it is possible to prevent a loop from occurring due to a connection to a radio node subject thereto. On the other hand, if the decision shows the presence of another radio node outside of only the radio node(s) having a root node ID larger than the node ID of the radio node 700, the control unit 703 selects, as a host connection-accepting radio node, of the related radio nodes, a radio node having the smallest hop number and the smallest node ID (step S1006). Still moreover, the control unit 703 issues a connection request to the relevant radio node. Incidentally, it is also possible that the transmission unit 701 carries out the transmission of the connection request in place of the control unit 703. Thus, the connection is made to, of the groups having a tree structure, a group having a large scale so as to construct a group with a larger scale. This enables the communications among more radio nodes.

In addition, with reference to FIG. 11, a description will be given hereinbelow of a procedure of state information change processing in each radio node in a case in which the radio node apparatus according to the second embodiment of the present invention selects a host connection-accepting radio node and actually transmits a connection request so that a small independent group is absorbed into a large group. In FIG. 11, there are shown five radio nodes, and further shown a group including the radio nodes 1', 2' and 3' where the radio node 1' works as a root node and a group including the radio nodes 4' and 5' where the radio node 4' works as a root node. A description will be given hereinbelow of a case in which the radio node 4' serving as a root node is connected to the radio node 2' in the group where the radio node 1' serves as a root node.

First, the radio node 4', which requests the connection, transmits a connection request, in which its own state information is handled as a parameter, to the host connection-accepting radio node 2' (step S1101). The radio node 2' returns a connection response to the radio node 4' (step S1102). Following this, the radio node 2' adds the newly connected radio node 4' to a connection management table indicative of the number of nodes further connected for each of the radio nodes connected to itself and adds the node number (number of nodes) in the state information of the radio node 4', which has received through the connection request, to the node number in its own state information so as to change the node number in the state information and, then, transmits a state change notification to the radio nodes 1' and 3' (step S1103 and S1104). The connection management table and the state change notification will be mentioned later.

Upon receipt of the state change notification, each of the radio nodes 1' and 3' changes the node number in its own state information through the use of a change node number (quantity of change) indicated in a parameter. Moreover, the radio node 1', when receiving state notification information from the radio node 2' which is a subordinate when viewed from itself, also changes the corresponding node number of the radio node 2' in its own connection management table. On the other hand, the radio node 4', which has confirmed the connection through the connection response, carries out the change processing as follows through the use of a parameter in the state information of the radio node 2' selected. First, the radio node 4' sets, as a new node number, a value obtained by adding the node number received from the radio node 2' to its own node number. Subsequently, the radio node 4' sets, as a new hop number, a value obtained by adding 1 to the hop number of the radio node 2'.

Moreover, the radio node 4' changes the root node ID to a "radio node 1'" which is a parameter in the state information of the radio node 2'. After the completion of the change processing, the radio node 4' transmits a connection change notification to the radio node 5' connected to its subordinate (step S1105). Upon receipt of the connection change notification, the radio node 5' changes the node number in its own state information through the use of the change node number indicated in a parameter. Moreover, the radio node 5' changes the hop number to a value obtained by adding 1 to the hop number indicated in the parameter, and further changes the root node ID. The connection change notification will be mentioned later. Let it be assumed that the above-described change processing in the radio nodes 1' to 5' is conducted by the control unit 703 of each of the radio nodes 1' to 5'.

Secondly, referring to FIG. 12, a description will be given hereinbelow of the aforesaid connection management table. After activated, each of the radio nodes, when a radio node to be connected to itself appears, adds a table to the connection management table in units of radio nodes connected thereto. This connection management table includes the node ID and node number of a radio node (child node) connected thereto. This node number represents the total number of radio nodes connected as a subordinate to that radio node, which includes the connecting radio node itself. The updating of the connection management table is made when a new radio node is connected to itself (addition of a table), when it receives a state change notification from a subordinate radio node (change of node number), and when a subordinate radio node is disconnected (removal of a table). The connection management table is stored in the storage unit 704.

In addition, referring to FIG. 13, a description will be given hereinbelow of the aforesaid state change notification. The state change notification includes a root node ID (R-ID), its own node ID (N-ID), an object node ID (T-ID) and a change node number ($\Delta$N). The root node ID represents the ID of a root node in a group to which a state change notification is to be made, its own node ID depicts the ID of the radio node which has outputted the state change notification, the object node ID denotes the node ID of the radio node which is an object of addition or deletion of the connection management table due to disconnection or the like, and the change node number signifies the number of radio nodes concretely added or deleted. For example, at connection, the change node number takes a positive (plus) value while, at disconnection, it takes a negative (minus) value. The object node ID is used to distinguish between state change notifications when connection, disconnection and others occurs in a plurality of nodes.

Still additionally, referring to FIG. 14, a description will be given hereinbelow of a state information change processing procedure at disconnection of a radio link. FIG. 14 shows a state in which a radio link between the radio node 2' and the radio node 4' falls into an incommunicable condition due to, for example, movement of the radio node 4'. When the radio node 2' and the radio node 4' make a decision that the radio link falls into a disconnected condition, each of the radio nodes 2' and 4' conducts the following processing. Let it be assumed that the following processing is conducted in the control unit 703 in each radio node. Moreover, the decision on the disconnection of the radio link can be made on the basis of, for example, the cutoff of reception of beacon or in such a manner as to output a keep arrive signal periodically.

When the radio node 4' connected as a subordinate is separated due to disconnection, the radio node 2' removes the related data on the radio node 4' from the its own connection management table and sets, as a new node number, a value obtained by subtracting the node number corresponding to the radio node 4' in the connection management table before the removal from the node number held as the state information. Following this, the radio node 2' sets the node number corresponding to the radio node 4' in the connection management table before the removal as the change node number and outputs it as a state change notification to the radio nodes 1' and 3' (steps S1401 and S1402). Upon receipt of the state change notification, each of the radio nodes 1' and 3' performs the subtraction on the node number in its own state information. Moreover, upon receipt of the state change notification from the radio node 2', likewise, the radio node 1' performs the subtraction on the node number of the radio node 2' in its own connection management table.

On the other hand, the radio node 4' carries out the following change as state information change processing. First, the radio node 4' changes the root node ID to its own node ID. Subsequently, the radio node 4' changes the node number to the value of the total number of nodes held in its own connection management table and calculates a subtraction value, and changes the hop number to 1. Thus, the radio node 4' operates as root node in a new group. Following this, the radio node 4' outputs a connection change notification, mentioned later, to the subordinate radio node 5' connected thereto (step S1403). Upon receipt of the connection change notification, the radio node 5' carries out a change of the root node ID and a subtraction of a change node number through the use of a parameter included in the connection change notification and sets, as a new hop number, a value obtained by adding 1 to the hop number in the received parameter.

Moreover, the aforesaid connection change notification will be described hereinbelow with reference to FIG. 15. The connection change notification includes a new root node ID (nR-ID), an old root node ID (oR-ID), a change node number ($\Delta$N), and a hop number (H). The respective components of the connection change notification (step S1105 in FIG. 11) to be outputted when the radio node 4' has a connection with the radio node 2' are as follows. That is, the new root node ID represents a root node ID of a group which is an object of new connection. The old root node ID signifies a root node ID of a group to be absorbed due to the connection, i.e., the olds root node ID signifies a node ID of a radio node which outputs a state change notification. The change node number depicts the number of radio nodes in a group to which a host connection-accepting radio node before the connection pertains, i.e., it denotes a node number N notified from the radio node 2'. The hop number designates a value obtained by adding 1 to the hop number of the host connection-accepting radio node.

On the other hand, the respective components of a connection change notification (step S1403 in FIG. 14) to be outputted when the radio node 4' is disconnected from the radio node 2' are as follows. That is, a new root node ID represents an ID of a root node in a group after the disconnection, i.e., the new root ID represents an node ID of a radio node which has outputted a connection change notification. The old root node ID designates a root node ID of a group to which it has pertained before the disconnection. The change node number signifies the aforesaid subtraction value, i.e., signifies the number of radio nodes in a group to which the host connection-accepting radio node before the connection has belonged. Moreover, the hop number stands at 1 in the case of a root node and, when a connection change notification is transmitted to subordinate radio nodes, it stands at a value obtained by adding 1 to the received hop number.

Furthermore, in a case in which a disconnection occurs in the radio link between the radio node 2' and the radio node 4', when the radio node 4' newly becomes a root node and seeks a connection-accepting radio node, the radio node 4' can hold, as a cache, the root node ID of the group to which it has connected so far. The radio node 4' can hold a timer so that the cache is made clear after the elapse of a set period of time. If there is a root node ID in the cache, for the selection of a host connection-accepting radio node, a comparison is made between root node IDs of the received state information and a connection to a group having the same root node ID as that cached is made on a preferential basis. At this time, even if the node number is smaller than that of the group to which it pertains, the connection to the group having the same root node ID is made on a preferential basis. Thus, even if a disconnection once occurs, when the restoration immediately takes place to the original state, it is possible to maintain the tree without changing the connection arrangement.

Referring to FIG. 16, a description will be given hereinbelow of host connection-accepting radio node selection processing in a case in which a root node ID is held as a cache at disconnection. For example, the transmission unit 701 of the radio node 700 broadcasts a state information request to surrounding radio nodes and, on the basis of the state information the reception unit 702 of the radio node 700 receives for a specified period of time set therein, the control unit 703 of the radio node 700 collects and lists the state information of the surrounding radio nodes (step S1601). The control unit 703 makes a decision as to whether or not the root node ID before the disconnection, cached at the disconnection, is identical to the root node ID in the received state information (step S1602). If the decision shows that they are the same, the control unit 703 carries out the processing in a step S1607. If they are not identical to each other, the control unit 703 continuously carries out the processing in a step 1603 and the processing in subsequent steps. The processing from the step S1603 to the step S1607 is the same as the above-described processing from the step S1002 to the step S1006 in FIG. 10, and the description thereof will be omitted for brevity.

As described above, in the multi-hop radio system constructing method and radio node apparatus according to the second embodiment of the present invention, the state information has a parameter indicative of the total number of nodes included in a group, and this parameter is used in selecting a host connection-accepting radio node so that a connection can be made to a group having more nodes to increase the radio nodes with which it is communicable. In addition, each radio node manages, for each subordinate radio node connected thereto, the number of radio nodes connected as subordinates to this radio node and, hence, when a variation occurs in node number of the group due to new connection, disconnection or the like, it can quickly notify the occurrence of variation in node number to the entire group. Moreover, a radio node which requests state information is only a root node, thus minimizing the variation of the tree structure at connection, disconnection or the like and considerably reducing the change procedure.

The radio node apparatus, multi-hop radio system and multi-hop radio system constructing method according to the present invention can construct a tree type multi-hop radio system in which mutual radio nodes determine a radio node which becomes a root node of a tree in an autonomous manner and the root node is set as a root in an autonomous manner. Accordingly, the present invention is valuably applicable to a radio node apparatus which constructs a multi-hop radio system in an autonomous manner, a multi-hop radio system and a multi-hop radio system constructing method.

The invention claimed is:

1. A method of constructing a multi-hop radio system including a plurality of radio nodes among which are ad-hoc connected in a tree structure and carry out multi-hop communication, wherein:
   a first radio node among the plurality of radio nodes acquires, from at least two second radio nodes in the plurality of radio nodes, state information including identification information of a root node of a group to which each of the second radio nodes is ad-hoc connected;
   the first radio node selects a radio node from the second radio nodes as a first connection-accepting radio node based on a predetermined condition and connects to the first connection-accepting radio node; and
   in the case where the first radio node reselects a radio node to be a second connection-accepting radio node after the connection between the first radio node and the first connection-accepting radio node is disconnected, the first node selects a radio node as the second connection-accepting radio node, whose identification information of the root node included in the state information acquired from the radio node is the same as identification information of a root node of a group to which the first radio node is ad-hoc connected and connects to the second connection-accepting radio node.

2. The method according to claim 1, wherein the state information which the first radio node acquires from the second radio nodes furthermore includes number of hops, from the rood node of the group to which each of the second radio nodes is ad-hoc connected, to each of the second radio nodes; and
   the first radio node selects a radio node from the second radio nodes as the first connection-accepting radio node, whose number of hops is the smallest.

3. The method according to claim 1, wherein the first radio node acquires the state information from the second radio nodes only in the case where the first radio node is a root node of the radio nodes to which the first radio node is ad-hoc connected.

4. A radio node apparatus in a multi-hop radio system including a plurality of radio nodes among which are ad-hoc connected in a tree structure and carry out multi-hop communication, the radio node apparatus comprising:
   a transmission unit that transmits a request of acquiring state information including identification information of a root node of a group to which each of other radio nodes is ad-hoc connected from the other radio nodes other than a subject node as the radio node apparatus among the plurality of radio nodes;
   a reception unit that receives the state information from the other radio nodes;
   a control unit that selects a radio node from the other radio nodes as a first connection-accepting radio node based on a predetermined condition and connects to the first connection-accepting radio node and, in the case of reselecting a radio node to be a second connection-accepting radio node after the connection between the subject node and the first connection-accepting radio node is disconnected, selects a radio node as the second connection-accepting radio node, whose identification information of the root node included in the state information acquired from the radio node is the same as identification information of a root node of a group to which the subject node is ad-hoc connected and connects to the second connection-accepting radio node.

5. The radio node apparatus according to claim 4, wherein the state information received from the other radio nodes furthermore includes number of hops, from the rood node of the group to which each of the other radio nodes is ad-hoc connected, to each of the other radio nodes; and
   the control unit selects a radio node from the other radio nodes as the first connection-accepting radio node, whose number of hops is the smallest.

6. The radio node apparatus according to claim 4, wherein the transmission unit transmits the request of acquiring the state information only in the case where the subject node is a root node of the radio nodes to which the subject node is ad-hoc connected.

* * * * *